US009443377B2

(12) United States Patent
Jones

(10) Patent No.: US 9,443,377 B2
(45) Date of Patent: Sep. 13, 2016

(54) WEB PAGES FOR GAMING DEVICES

(75) Inventor: William Jones, Incline Village, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1459 days.

(21) Appl. No.: 12/473,617

(22) Filed: May 28, 2009

(65) Prior Publication Data

US 2009/0298583 A1 Dec. 3, 2009

Related U.S. Application Data

(60) Provisional application No. 61/057,306, filed on May 30, 2008.

(51) Int. Cl.
*G06F 15/16* (2006.01)
*G07F 17/32* (2006.01)

(52) U.S. Cl.
CPC ........... *G07F 17/3223* (2013.01); *G07F 17/32* (2013.01)

(58) Field of Classification Search
CPC ............................ G07F 17/32; G07F 17/3223
USPC .................................................. 709/203, 225
See application file for complete search history.

(56) References Cited

U.S. PATENT DOCUMENTS

| | | | | |
|---|---|---|---|---|
| 1,034,402 | A | 7/1912 | Hardy | |
| 1,361,202 | A | 12/1920 | Thomas | |
| 1,599,390 | A | 9/1926 | Albert | |
| 1,727,800 | A | 9/1929 | Albert | |
| 1,890,504 | A | 12/1932 | Ferguson, Jr. | |
| 2,567,223 | A | 9/1951 | Maher et al. | |
| 2,595,845 | A | 5/1952 | Hagwell | 311/106 |
| 2,663,418 | A | 12/1953 | Grunwald | 206/62 |
| 2,694,662 | A | 11/1954 | Hunter, Jr. | 154/121 |
| 2,731,271 | A | 1/1956 | Brown | 273/149 |
| 3,222,071 | A | 12/1965 | Lang | 273/149 |
| 3,312,473 | A | 4/1967 | Friedman et al. | 273/149 |
| 3,339,223 | A | 9/1967 | Laby | 16/105 |
| 3,377,070 | A | 4/1968 | Nottoli | 273/149 |

(Continued)

FOREIGN PATENT DOCUMENTS

| | | | |
|---|---|---|---|
| DE | 19940954 | A1 | 3/2001 |
| EP | 1074955 | A2 | 2/2001 |

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Oleg Survillo
(74) *Attorney, Agent, or Firm* — Seed IP Law Group PLLC

(57) ABSTRACT

A Web page is received at a gaming device from a Web server device and then displayed. Information indicative of a player's interaction with the Web page is received at the Web server device. The Web server device sends a request to a gaming property server device based at least in part on the interaction, and the gaming property server device sends a reply to the Web server device. The Web server device then provides Web content to the gaming device based at least in part on the reply. A display of the gaming device is changed based at least in part on the Web content.

36 Claims, 12 Drawing Sheets

(56) References Cited

U.S. PATENT DOCUMENTS 3,493,728 A 2/1970 Braden et al. ............ 235/61.11
3,561,756 A 2/1971 Barnett .......................... 271/41
3,667,759 A 6/1972 Barr .......................... 273/152.1
3,690,670 A 9/1972 Cassady et al. .......... 273/149 P
3,735,982 A 5/1973 Gerfin .......................... 273/1 E
3,740,742 A 6/1973 Thompson et al. .......... 340/280
3,751,041 A 8/1973 Seifert ...................... 273/149 P
3,752,962 A 8/1973 Greskovics ............ 235/61.11 D
3,766,452 A 10/1973 Burpee et al. ............ 317/262 R
3,787,660 A 1/1974 Meyers et al. ........... 235/61.9 R
3,810,172 A 5/1974 Burpee et al. ............ 343/5 PD
3,814,436 A 6/1974 Boren ...................... 273/149 P
3,897,954 A 8/1975 Erickson et al. ......... 273/149 R
3,907,282 A 9/1975 Hunter ......................... 271/233
3,929,339 A 12/1975 Mattioli .................... 273/148 A
3,937,311 A 2/1976 Gehrke .......................... 192/45
3,937,312 A 2/1976 Gehrke .......................... 192/45
3,942,616 A 3/1976 Elmore .......................... 192/45
3,966,047 A 6/1976 Steiner ........................... 209/75
3,972,573 A 8/1976 Marola ........................ 308/217
3,990,555 A 11/1976 Carullo .......................... 192/45
3,993,176 A 11/1976 Marola et al. .................. 192/45
3,993,177 A 11/1976 Gehrke .......................... 192/45
3,994,377 A 11/1976 Elmore .......................... 192/45
4,023,167 A 5/1977 Wahlstrom .............. 343/6.5 SS
4,026,309 A 5/1977 Howard ........................ 133/8 R
4,031,376 A 6/1977 Corkin, Jr. .................... 235/156
4,095,795 A 6/1978 Saxton et al. ............ 273/143 R
4,108,361 A 8/1978 Krause ......................... 235/375
4,135,663 A 1/1979 Nojiri et al. .................. 235/463
4,241,921 A 12/1980 Miller ...................... 273/148 A
4,244,582 A 1/1981 Raees et al. .................. 273/293
4,264,074 A 4/1981 Sobajima ................. 273/149 R
4,283,708 A 8/1981 Lee ....................... 340/146.3 Z
4,310,160 A 1/1982 Willette et al. ........... 273/149 R
4,339,798 A 7/1982 Hedges et al. ................ 364/412
4,373,726 A 2/1983 Churchill et al. ........ 273/138 A
4,377,285 A 3/1983 Kadlic ..................... 273/148 A
4,428,582 A 1/1984 Smith .......................... 273/296
4,448,419 A 5/1984 Telnaes .................... 273/143 R
4,457,512 A 7/1984 Stevenson ................ 273/148 A
4,467,424 A 8/1984 Hedges et al. ................ 364/412
4,470,496 A 9/1984 Steiner .......................... 194/4 C
4,475,564 A 10/1984 Koester et al. ............... 133/8 R
4,482,058 A 11/1984 Steiner ......................... 209/534
4,497,488 A 2/1985 Plevyak et al. ........... 273/149 R
4,503,963 A 3/1985 Steiner .......................... 194/4 C
4,510,490 A 4/1985 Anderson, III et al. ...... 340/572
4,512,580 A 4/1985 Matviak ................... 273/148 A
4,517,558 A 5/1985 Davids ......................... 340/700
4,517,654 A 5/1985 Carmean ....................... 364/521
4,518,001 A 5/1985 Branham ...................... 133/5 R
4,531,117 A 7/1985 Nourse et al. ................ 340/572
4,531,187 A 7/1985 Uhland ......................... 364/412
4,531,909 A 7/1985 Takeshita ........................ 432/37
4,534,562 A 8/1985 Cuff et al. ................ 273/149 P
4,574,824 A 3/1986 Paulsen et al. ............... 133/4 R
4,586,712 A 5/1986 Lorber et al. ............. 273/149 R
4,588,292 A 5/1986 Collins ........................... 356/71
4,592,377 A 6/1986 Paulsen et al. ............... 133/5 R
4,621,814 A 11/1986 Stepan et al. ............. 273/138 A
4,635,937 A 1/1987 Dickinson et al. ....... 273/143 R
4,636,846 A 1/1987 Villarreal ..................... 358/100
4,636,896 A 1/1987 Takikawa ...................... 360/105
4,650,057 A 3/1987 Koester ......................... 194/346
4,656,463 A 4/1987 Anders et al. ................ 340/572
4,659,082 A 4/1987 Greenberg ................ 273/149 R
4,660,025 A 4/1987 Humphrey .................... 340/572
4,660,833 A 4/1987 Dickinson et al. ....... 273/143 R
4,662,637 A 5/1987 Pfeiffer .................... 273/149 P
4,667,959 A 5/1987 Pfeiffer et al. ............ 273/149 R
4,693,477 A 9/1987 Dickinson et al. ....... 273/143 R
4,693,480 A 9/1987 Smith .......................... 273/296
4,711,452 A 12/1987 Dickinson et al. ....... 273/143 R
4,721,307 A 1/1988 Okada ...................... 273/143 R
4,725,079 A 2/1988 Koza et al. ..................... 283/73
4,728,108 A 3/1988 Neuwahl ....................... 273/296
4,746,830 A 5/1988 Holland .................... 310/313 D
4,750,743 A 6/1988 Nicoletti .................. 273/148 A
4,755,941 A 7/1988 Bacchi ......................... 364/412
4,770,421 A 9/1988 Hoffman .................. 273/149 R
4,802,218 A 1/1989 Wright et al. .................. 380/23
4,807,884 A 2/1989 Breeding ................. 273/149 R
4,814,589 A 3/1989 Storch et al. ................ 235/375
4,817,528 A 4/1989 Baker .......................... 101/395
4,822,050 A 4/1989 Normand et al. ........ 273/149 P
4,832,341 A 5/1989 Muller et al. ................ 273/139
4,832,342 A 5/1989 Plevyak et al. ........... 273/149 R
4,837,728 A 6/1989 Barrie et al. .................. 364/412
4,859,991 A 8/1989 Watkins et al. ............... 340/572
4,861,041 A 8/1989 Jones et al. .................. 273/292
4,870,391 A 9/1989 Cooper ........................ 340/572
4,885,700 A 12/1989 Kondziolka et al. ......... 364/519
4,889,367 A 12/1989 Miller ............................ 283/88
4,920,335 A 4/1990 Andrews ....................... 340/572
4,926,996 A 5/1990 Eglise et al. .................. 194/212
4,948,138 A 8/1990 Pease et al. ............. 273/138 A
4,951,950 A 8/1990 Normand et al. ........ 273/149 P
4,969,648 A 11/1990 Hollinger et al. ........ 273/149 R
4,973,851 A 11/1990 Lee ............................. 250/556
4,978,322 A 12/1990 Paulsen .......................... 453/57
4,995,615 A 2/1991 Cheng .......................... 273/292
4,998,737 A 3/1991 Lamle .......................... 273/296
5,000,453 A 3/1991 Stevens et al. ........... 273/149 R
5,007,641 A 4/1991 Seidman .................. 273/138 A
5,007,649 A 4/1991 Richardson
5,031,914 A 7/1991 Rosenthal .................... 273/146
5,039,102 A 8/1991 Miller ...................... 273/148 R
5,042,809 A 8/1991 Richardson ............... 273/138 A
5,050,881 A 9/1991 Nagao ...................... 273/143 R
5,053,612 A 10/1991 Pielemeier et al. .......... 235/462
5,058,893 A 10/1991 Dickinson et al. ....... 273/143 R
5,067,713 A 11/1991 Soules et al. ............ 273/149 P
5,067,724 A 11/1991 Rinkavage .................... 273/292
5,067,725 A 11/1991 Leach .......................... 273/302
5,083,800 A 1/1992 Lockton ........................ 273/439
5,096,197 A 3/1992 Embury ................... 273/149 R
5,100,137 A 3/1992 Fulton ...................... 273/85 CP
5,103,081 A 4/1992 Fisher et al. .................. 235/464
5,103,234 A 4/1992 Watkins et al. ............... 343/742
5,110,134 A 5/1992 Laughlin et al. ............. 273/293
5,114,153 A 5/1992 Rosenwinkel et al. ....... 273/292
5,121,921 A 6/1992 Friedman et al. ........ 273/149 P
5,154,419 A 10/1992 Madhavan ............... 273/126 R
5,156,397 A 10/1992 Valenza, Jr. ............. 273/138 A
5,157,602 A 10/1992 Fields et al. .................. 364/412
5,166,502 A 11/1992 Rendleman et al. ......... 235/492
5,167,411 A 12/1992 Isobe ........................... 271/273
5,167,413 A 12/1992 Fulton ...................... 273/85 CP
5,167,571 A 12/1992 Waller ............................ 453/29
5,178,389 A 1/1993 Bentley et al. ........... 273/138 A
5,179,517 A 1/1993 Sarbin et al. ................. 364/410
5,184,821 A 2/1993 Korenek .................. 273/138 A
5,186,464 A 2/1993 Lamle ...................... 273/149 R
5,188,363 A 2/1993 Marnell, II et al. ...... 273/85 CP
5,199,710 A 4/1993 Lamle ...................... 273/149 R
5,216,234 A 6/1993 Bell ............................. 235/494
5,224,712 A 7/1993 Laughlin et al. ............. 273/304
5,240,140 A 8/1993 Huen ............................. 221/13
5,242,041 A 9/1993 Isobe ........................... 194/207
5,242,163 A 9/1993 Fulton ...................... 273/85 CP
5,248,142 A 9/1993 Breeding ................. 273/138 R
5,251,897 A 10/1993 Fulton ...................... 273/85 CP
5,258,837 A 11/1993 Gormley ....................... 358/140
5,259,907 A 11/1993 Soules et al. ................ 156/277
5,261,667 A 11/1993 Breeding ................. 273/149 R
5,265,874 A 11/1993 Dickinson et al. ....... 273/138 A
5,273,281 A 12/1993 Lovell ...................... 273/138 R
5,275,400 A 1/1994 Weingardt et al. ....... 273/85 CP
5,275,411 A 1/1994 Breeding ................. 273/149 R
5,283,422 A 2/1994 Storch et al. ................ 235/375
5,288,081 A 2/1994 Breeding ...................... 273/292
5,303,921 A 4/1994 Breeding ................. 273/149 R
5,312,104 A 5/1994 Miller ...................... 273/148 R

(56) References Cited

U.S. PATENT DOCUMENTS 5,319,181 A 6/1994 Shellhammer et al. ...... 235/462
5,321,241 A 6/1994 Craine
5,322,295 A 6/1994 Cabot et al. .................. 273/292
5,324,035 A 6/1994 Morris et al. ............ 273/138 A
5,326,104 A 7/1994 Pease et al. ............. 273/138 A
5,332,219 A 7/1994 Marnell, II et al. ...... 273/138 A
5,343,028 A 8/1994 Figarella et al. ............ 235/462
5,344,144 A 9/1994 Canon ...................... 273/138 A
5,344,146 A 9/1994 Lee .......................... 273/149 R
5,356,145 A 10/1994 Verschoor ................ 273/149 R
5,361,885 A 11/1994 Modler ........................ 194/214
5,362,053 A 11/1994 Miller ...................... 273/148 R
5,364,104 A 11/1994 Jones et al. ................... 273/292
5,374,061 A 12/1994 Albrecht .................. 273/149 R
5,381,019 A 1/1995 Sato ............................. 250/556
5,382,024 A 1/1995 Blaha ...................... 273/149 R
5,386,103 A 1/1995 DeBan et al. ................ 235/379
5,389,945 A 2/1995 Sheridon ........................ 345/85
5,393,057 A 2/1995 Marnell, II ............... 273/85 CP
5,398,932 A 3/1995 Eberhardt et al. ........ 273/138 A
5,472,194 A 12/1995 Breeding et al. ......... 273/138 A
5,493,613 A 2/1996 Denno et al. ................... 380/24
5,505,449 A 4/1996 Eberhardt et al. ........ 273/138 A
5,505,461 A 4/1996 Bell et al. ...................... 273/433
5,507,489 A 4/1996 Reibel et al. ............ 273/138 A
5,559,312 A 9/1996 Lucero .......................... 235/380
5,562,284 A 10/1996 Stevens ........................ 273/139
5,580,311 A 12/1996 Haste, III ........................ 463/29
5,584,764 A 12/1996 Inoue .............................. 463/20
5,605,334 A 2/1997 McCrea, Jr. .................. 273/309
5,605,506 A 2/1997 Hoorn et al. ................... 463/47
5,609,524 A 3/1997 Inoue .............................. 463/20
5,613,680 A 3/1997 Groves et al. ............ 273/138.2
5,613,912 A 3/1997 Slater .............................. 463/25
5,643,086 A 7/1997 Alcorn et al. .................. 463/29
5,643,088 A 7/1997 Vaughn et al. ................. 463/40
5,651,548 A 7/1997 French et al. ................ 273/309
5,655,961 A 8/1997 Acres et al. .................... 463/27
5,707,287 A 1/1998 McCrea, Jr. .................... 463/27
5,735,742 A 4/1998 French ............................ 463/25
5,737,418 A 4/1998 Saffari et al. ..................... 380/9
5,741,183 A 4/1998 Acres et al. .................... 463/42
5,745,110 A 4/1998 Ertemalp
5,759,102 A 6/1998 Pease et al. .................... 463/42
5,770,533 A 6/1998 Franchi ........................... 463/42
5,779,545 A 7/1998 Berg et al. ...................... 463/22
5,781,647 A 7/1998 Fishbine et al. .................. 382/1
5,800,268 A 9/1998 Molnick ......................... 463/40
5,813,912 A 9/1998 Shultz ............................. 463/25
5,823,879 A 10/1998 Goldberg et al. ............... 463/42
5,830,067 A 11/1998 Graves et al. .................. 463/40
5,830,068 A 11/1998 Brenner et al. ................. 463/42
5,848,426 A 12/1998 Wang et al.
5,850,447 A 12/1998 Peyret ............................. 380/25
5,851,149 A 12/1998 Xidos et al. .................... 463/42
5,885,158 A 3/1999 Torango et al. ................ 463/27
5,890,963 A 4/1999 Yen ................................. 463/42
5,895,451 A 4/1999 Yamade et al.
5,902,983 A 5/1999 Crevelt et al. ................ 235/380
5,905,847 A 5/1999 Kobayashi et al.
5,910,048 A 6/1999 Feinberg ......................... 463/25
5,911,626 A 6/1999 McCrea, Jr. .................... 463/27
5,919,090 A 7/1999 Mothwurf ....................... 463/25
5,919,091 A 7/1999 Bell et al. ....................... 463/25
5,936,527 A 8/1999 Isaacman et al. ......... 340/572.1
5,941,769 A 8/1999 Order .............................. 463/12
5,941,771 A 8/1999 Haste, III ........................ 463/17
5,957,776 A 9/1999 Hoehne ........................... 463/25
5,971,851 A 10/1999 Pascal et al. ................... 463/24
5,974,135 A 10/1999 Breneman et al.
5,999,808 A 12/1999 LaDue .......................... 455/412
6,001,016 A 12/1999 Walker et al. .................. 463/42
6,004,207 A 12/1999 Wilson, Jr. et al. ............ 463/20
6,042,150 A 3/2000 Daley ............................ 283/86
6,047,322 A 4/2000 Vaid et al.
6,048,269 A 4/2000 Burns et al. .................... 463/25
6,062,979 A 5/2000 Inoue .............................. 463/12
6,068,553 A 5/2000 Parker ............................ 463/27
6,077,161 A 6/2000 Wisler ............................ 463/11
6,080,063 A 6/2000 Khosla ............................ 463/42
6,083,105 A 7/2000 Ronin et al. .................... 463/17
6,089,980 A 7/2000 Gauselmann ................... 463/27
6,093,103 A 7/2000 McCrea, Jr. .................... 463/27
6,102,799 A 8/2000 Stupak ............................ 463/27
6,104,815 A 8/2000 Alcorn et al. ................ 380/251
6,106,396 A 8/2000 Alcorn et al. .................. 463/29
6,110,041 A 8/2000 Walker et al. .................. 463/20
6,110,043 A 8/2000 Olsen ............................. 463/27
6,117,012 A 9/2000 McCrea, Jr. .................... 463/27
6,135,887 A 10/2000 Pease et al. .................... 463/42
6,146,273 A 11/2000 Olsen ............................. 463/27
6,149,522 A 11/2000 Alcorn et al. .................. 463/29
6,152,824 A 11/2000 Rothschild et al. ............ 463/42
6,162,121 A 12/2000 Morro et al. .................. 463/16
6,165,069 A 12/2000 Sines et al. ..................... 463/12
6,166,763 A 12/2000 Rhodes et al. ................ 348/143
6,168,523 B1 1/2001 Piechowiak et al. ........... 463/26
6,183,362 B1 2/2001 Boushy ........................... 463/25
6,183,366 B1 2/2001 Goldberg et al. ............... 463/42
6,185,184 B1 2/2001 Mattaway et al.
6,186,892 B1 2/2001 Frank et al. .................... 463/19
6,190,256 B1 2/2001 Walker et al. .................. 463/25
6,206,782 B1 3/2001 Walker et al. .................. 463/25
6,210,277 B1 4/2001 Stefan ............................ 463/27
6,217,447 B1 4/2001 Lofink et al. ................... 463/12
6,219,836 B1 4/2001 Wells et al. ..................... 717/11
6,227,972 B1 5/2001 Walker et al. .................. 463/25
6,234,898 B1 5/2001 Belamant et al. .............. 463/25
6,244,958 B1 6/2001 Acres ............................. 463/26
6,251,014 B1 6/2001 Stockdale et al. .............. 463/16
6,254,483 B1 7/2001 Acres
6,254,484 B1 7/2001 McCrea, Jr. .................... 463/27
6,256,651 B1 7/2001 Tuli
6,264,109 B1 7/2001 Chapet et al. ................ 235/492
6,264,561 B1 7/2001 Saffari et al. ................... 463/42
6,267,248 B1 7/2001 Johnson et al. .............. 209/547
6,275,586 B1 8/2001 Kelly .............................. 380/46
6,282,522 B1 * 8/2001 Davis et al. .................... 705/41
6,287,202 B1 9/2001 Pascal et al. ................... 463/42
6,302,793 B1 10/2001 Fertitta, III et al.
6,312,332 B1 11/2001 Walker et al.
6,319,125 B1 11/2001 Acres
6,334,814 B1 1/2002 Adams ........................... 463/20
6,346,044 B1 2/2002 McCrea, Jr. .................... 463/27
6,347,738 B1 2/2002 Crevelt et al. ................ 235/380
6,362,836 B1 3/2002 Shaw et al.
6,363,509 B1 3/2002 Parulkar et al.
6,380,953 B1 4/2002 Mizuno
6,383,076 B1 5/2002 Tiedeken ........................ 463/40
6,389,126 B1 5/2002 Bjornberg et al.
6,394,900 B1 5/2002 McGlone et al. .............. 463/20
6,394,907 B1 5/2002 Rowe ............................. 463/42
6,400,272 B1 6/2002 Holtzman et al. ......... 340/572.1
6,401,099 B1 6/2002 Koppolu et al.
6,409,595 B1 6/2002 Uihlein et al. .................. 463/29
6,409,602 B1 6/2002 Wiltshire et al. ............... 463/42
6,439,995 B1 8/2002 Hughs-Baird et al. ......... 463/20
6,439,996 B2 8/2002 LeMay et al. .................. 463/29
6,443,839 B2 9/2002 Stockdale et al. .............. 463/16
6,459,882 B1 10/2002 Palermo
6,460,848 B1 10/2002 Soltys et al. .............. 273/149 R
6,464,584 B2 10/2002 Oliver ............................ 463/25
6,468,155 B1 10/2002 Zucker et al. .................. 463/23
6,471,208 B2 10/2002 Yoseloff et al. .......... 273/143 R
6,488,581 B1 12/2002 Stockdale ....................... 463/29
6,488,585 B1 12/2002 Wells et al. ..................... 463/43
6,490,285 B2 12/2002 Lee et al.
6,494,454 B2 12/2002 Adams ......................... 273/292
6,503,147 B1 1/2003 Stockdale et al. .............. 463/29
6,505,772 B1 1/2003 Mollett et al. ................ 235/379
6,508,709 B1 1/2003 Karmarkar ...................... 463/42
6,508,710 B1 1/2003 Paravia et al. .................. 463/42
6,514,140 B1 2/2003 Storch ............................ 463/25
6,516,350 B1 2/2003 Lumelsky et al.

(56) References Cited

U.S. PATENT DOCUMENTS

| | | | | |
|---|---|---|---|---|
| 6,517,435 | B2 | 2/2003 | Soltys et al. | 463/25 |
| 6,517,436 | B2 | 2/2003 | Soltys et al. | 463/29 |
| 6,520,857 | B2 | 2/2003 | Soltys et al. | 463/29 |
| 6,527,271 | B2 | 3/2003 | Soltys et al. | 273/148 R |
| 6,527,638 | B1 | 3/2003 | Walker et al. | 463/25 |
| 6,530,836 | B2 | 3/2003 | Soltys et al. | 463/29 |
| 6,530,837 | B2 | 3/2003 | Soltys et al. | 463/29 |
| 6,533,276 | B2 | 3/2003 | Soltys et al. | 273/148 R |
| 6,533,662 | B2 | 3/2003 | Soltys et al. | 463/25 |
| 6,547,131 | B1 | 4/2003 | Foodman et al. | 235/380 |
| 6,572,472 | B1 | 6/2003 | Glavich | 463/16 |
| 6,575,829 | B2 | 6/2003 | Coleman et al. | 463/20 |
| 6,575,833 | B1 | 6/2003 | Stockdale | 463/29 |
| 6,575,834 | B1 | 6/2003 | Lindo | 463/40 |
| 6,578,847 | B1 | 6/2003 | Hedrick et al. | 273/138.2 |
| 6,579,179 | B2 | 6/2003 | Poole et al. | 463/25 |
| 6,579,180 | B2 | 6/2003 | Soltys et al. | 463/25 |
| 6,579,181 | B2 | 6/2003 | Soltys et al. | 463/25 |
| 6,581,747 | B1 | 6/2003 | Charlier et al. | 194/214 |
| 6,585,592 | B1 | 7/2003 | Crumby | 463/26 |
| 6,585,598 | B2 | 7/2003 | Nguyen et al. | 463/41 |
| 6,595,857 | B2 | 7/2003 | Soltys et al. | 463/29 |
| 6,607,441 | B1 | 8/2003 | Acres | 463/25 |
| 6,609,978 | B1 | 8/2003 | Paulsen | 463/42 |
| 6,612,928 | B1 | 9/2003 | Bradford et al. | 463/29 |
| 6,628,939 | B2 | 9/2003 | Paulsen | 455/414 |
| 6,629,184 | B1 | 9/2003 | Berg et al. | 710/306 |
| 6,629,591 | B1 | 10/2003 | Griswold et al. | 194/205 |
| 6,629,889 | B2 | 10/2003 | Mothwurf | 463/25 |
| 6,638,169 | B2 | 10/2003 | Wilder et al. | 463/35 |
| 6,638,170 | B1 | 10/2003 | Crumby | 463/42 |
| 6,641,484 | B2 | 11/2003 | Oles et al. | 463/47 |
| 6,645,077 | B2 | 11/2003 | Rowe | 463/42 |
| 6,652,378 | B2 | 11/2003 | Cannon et al. | 463/20 |
| 6,656,048 | B2 | 12/2003 | Olsen | |
| 6,659,864 | B2 | 12/2003 | McGahn et al. | 463/16 |
| 6,663,490 | B2 | 12/2003 | Soltys et al. | 463/25 |
| 6,672,960 | B1 | 1/2004 | B-Jensen | 463/20 |
| 6,675,152 | B1 | 1/2004 | Prasad et al. | 705/64 |
| 6,676,522 | B2 | 1/2004 | Rowe et al. | 463/42 |
| 6,682,421 | B1 | 1/2004 | Rowe et al. | 463/25 |
| 6,682,423 | B2 | 1/2004 | Brosnan et al. | 463/29 |
| 6,685,564 | B2 | 2/2004 | Oliver | 463/25 |
| 6,685,567 | B2 | 2/2004 | Cockerille et al. | 463/43 |
| 6,688,975 | B2 | 2/2004 | Baerlocher et al. | 463/16 |
| 6,688,977 | B1 | 2/2004 | Baerlocher et al. | 463/25 |
| 6,688,979 | B2 | 2/2004 | Soltys et al. | 463/25 |
| 6,699,128 | B1 | 3/2004 | Beadell et al. | 463/46 |
| 6,702,291 | B2 | 3/2004 | Grebler et al. | 273/292 |
| 6,702,672 | B1 | 3/2004 | Angell et al. | 463/25 |
| 6,712,695 | B2 | 3/2004 | Mothwurf et al. | |
| 6,712,696 | B2 | 3/2004 | Soltys et al. | 463/25 |
| 6,718,361 | B1 | 4/2004 | Basani et al. | 709/201 |
| 6,719,632 | B2 | 4/2004 | Palmer et al. | 463/25 |
| 6,722,985 | B2 | 4/2004 | Criss-Puszkiewicz et al. | |
| 6,726,099 | B2 | 4/2004 | Becker et al. | 235/380 |
| 6,728,740 | B2 | 4/2004 | Kelly et al. | 708/250 |
| 6,739,975 | B2 | 5/2004 | Nguyen et al. | 463/39 |
| 6,743,102 | B1 | 6/2004 | Fiechter et al. | 463/42 |
| 6,745,330 | B1 | 6/2004 | Maillot | 713/200 |
| 6,746,330 | B2 | 6/2004 | Cannon | 463/25 |
| 6,749,504 | B2 | 6/2004 | Hughs-Baird | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,800,029 | B2 | 10/2004 | Rowe et al. | 463/25 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,837,789 | B2 | 1/2005 | Garahi et al. | 463/29 |
| 6,846,238 | B2 | 1/2005 | Wells | 463/39 |
| 6,848,994 | B1 | 2/2005 | Knust et al. | 463/25 |
| 6,854,085 | B1 | 2/2005 | Morse | |
| 6,866,581 | B2 | 3/2005 | Martinek et al. | 463/16 |
| 6,866,586 | B2 | 3/2005 | Oberberger et al. | 463/42 |
| 6,884,170 | B2 | 4/2005 | Rowe | |
| 6,884,173 | B2 | 4/2005 | Gauselmann | |
| 6,884,174 | B2 | 4/2005 | Lundy et al. | 463/42 |
| 6,896,618 | B2 | 5/2005 | Benoy et al. | 463/25 |
| 6,899,627 | B2 | 5/2005 | Lam et al. | 463/40 |
| 6,901,440 | B1 | 5/2005 | Bimm et al. | |
| 6,905,411 | B2 | 6/2005 | Nguyen et al. | 463/25 |
| 6,908,387 | B2 | 6/2005 | Hedrick et al. | |
| 6,962,530 | B2 | 11/2005 | Jackson | 463/29 |
| 6,971,956 | B2 | 12/2005 | Rowe et al. | 463/25 |
| 6,972,682 | B2 | 12/2005 | Lareau et al. | 340/568.1 |
| 6,993,587 | B1 | 1/2006 | Basani et al. | 709/229 |
| 6,997,803 | B2 | 2/2006 | LeMay et al. | 463/20 |
| 7,005,985 | B1 | 2/2006 | Steeves | 340/572.1 |
| 7,013,469 | B2 | 3/2006 | Smith et al. | |
| 7,025,674 | B2 | 4/2006 | Adams et al. | |
| 7,027,996 | B2 | 4/2006 | Levinson | |
| 7,035,626 | B1 | 4/2006 | Luciano, Jr. | 455/414.1 |
| 7,050,056 | B2 | 5/2006 | Meyringer | |
| 7,051,101 | B1 | 5/2006 | Dubrovsky et al. | |
| 7,062,470 | B2 | 6/2006 | Prasad et al. | 705/64 |
| 7,063,617 | B2 | 6/2006 | Brosnan et al. | 463/25 |
| 7,077,332 | B2 | 7/2006 | Verschuur et al. | 235/492 |
| 7,086,947 | B2 | 8/2006 | Walker et al. | 463/25 |
| 7,099,035 | B2 | 8/2006 | Brooks et al. | 358/1.15 |
| 7,100,184 | B1 | 8/2006 | Kahn | |
| 7,112,138 | B2 | 9/2006 | Hedrick et al. | 463/29 |
| 7,114,718 | B2 | 10/2006 | Grauzer et al. | 273/149 R |
| 7,116,782 | B2 | 10/2006 | Jackson et al. | 380/251 |
| 7,120,879 | B2 | 10/2006 | Gutberlet et al. | |
| 7,147,558 | B2 | 12/2006 | Giobbi | 463/25 |
| 7,168,089 | B2 | 1/2007 | Nguyen et al. | 726/4 |
| 7,179,170 | B2 | 2/2007 | Martinek et al. | 463/29 |
| 7,186,181 | B2 | 3/2007 | Rowe | 463/42 |
| 7,197,765 | B2 | 3/2007 | Chan et al. | 726/8 |
| 7,198,571 | B2 | 4/2007 | LeMay et al. | 463/25 |
| RE39,644 | E | 5/2007 | Alcorn et al. | 380/251 |
| 7,234,698 | B2 | 6/2007 | Grauzer et al. | 273/149 R |
| 7,260,834 | B1 | 8/2007 | Carlson | |
| 7,264,241 | B2 | 9/2007 | Schubert et al. | 273/149 R |
| 7,271,727 | B2 | 9/2007 | Steeves | 340/572.7 |
| 7,291,068 | B2 | 11/2007 | Bryant et al. | 463/25 |
| 7,293,282 | B2 | 11/2007 | Danforth et al. | |
| 7,297,062 | B2 | 11/2007 | Gatto et al. | |
| 7,300,352 | B2 | 11/2007 | Rowe | |
| 7,303,475 | B2 | 12/2007 | Britt et al. | 463/42 |
| 7,309,065 | B2 | 12/2007 | Yoseloff et al. | 273/292 |
| 7,311,605 | B2 | 12/2007 | Moser | 463/25 |
| 7,329,185 | B2 | 2/2008 | Conover et al. | |
| 7,330,822 | B1 | 2/2008 | Robson et al. | |
| 7,331,520 | B2 | 2/2008 | Silva et al. | 235/381 |
| 7,337,330 | B2 | 2/2008 | Gatto et al. | |
| 7,346,682 | B2 | 3/2008 | Basani et al. | 709/224 |
| 7,349,920 | B1 | 3/2008 | Feinberg et al. | |
| 7,351,147 | B2 | 4/2008 | Stockdale et al. | 463/29 |
| 7,353,183 | B1 | 4/2008 | Musso | |
| 7,356,770 | B1 | 4/2008 | Jackson | |
| 7,363,342 | B1 | 4/2008 | Wang et al. | 709/204 |
| 7,364,510 | B2 | 4/2008 | Walker et al. | |
| 7,370,282 | B2 | 5/2008 | Cary | |
| 7,384,339 | B2 | 6/2008 | LeMay et al. | 463/30 |
| 7,398,327 | B2 | 7/2008 | Lee | 709/250 |
| 7,404,763 | B2 | 7/2008 | Malone et al. | 463/13 |
| 7,410,422 | B2 | 8/2008 | Fine | 463/42 |
| 7,419,428 | B2 | 9/2008 | Rowe | 463/25 |
| 7,427,233 | B2 | 9/2008 | Walker et al. | 463/16 |
| 7,427,236 | B2 | 9/2008 | Kaminkow et al. | |
| 7,434,805 | B2 | 10/2008 | Grauzer et al. | 273/149 R |
| 7,435,179 | B1 | 10/2008 | Ford | 463/42 |
| 7,438,221 | B2 | 10/2008 | Washington et al. | |
| 7,438,643 | B2 | 10/2008 | Brosnan et al. | 463/42 |
| 7,455,591 | B2 | 11/2008 | Nguyen | 463/42 |
| 7,460,863 | B2 | 12/2008 | Steelberg et al. | 455/419 |
| 7,465,231 | B2 | 12/2008 | Lewin et al. | |
| 7,473,178 | B2 | 1/2009 | Boyd et al. | |
| 7,483,394 | B2 | 1/2009 | Chang et al. | |
| 7,484,207 | B2 | 1/2009 | Sato | |
| 7,500,915 | B2 | 3/2009 | Wolf et al. | 463/27 |
| 7,510,186 | B2 | 3/2009 | Fleckenstein | 273/149 R |

(56) References Cited

U.S. PATENT DOCUMENTS 7,510,474 B2 3/2009 Carter, Sr. ..................... 463/29
7,515,718 B2 4/2009 Nguyen et al.
7,534,169 B2 5/2009 Amaitis et al. ................ 463/39
7,549,576 B2 6/2009 Alderucci et al. ........... 235/380
7,559,080 B2 7/2009 Bhargavan et al. ............ 726/1
7,566,274 B2 7/2009 Johnson et al.
7,575,234 B2 8/2009 Soltys et al. ............. 273/149 R
7,577,847 B2 8/2009 Nguyen et al. .............. 713/186
7,578,739 B2 8/2009 Gauselmann .................. 463/27
7,585,217 B2 9/2009 Lutnick et al. ................ 463/16
7,594,030 B2 9/2009 Teodosiu et al.
7,607,976 B2 10/2009 Baerlocher et al.
7,607,977 B2 10/2009 Baerlocher et al.
7,610,549 B2 10/2009 Vignet
7,611,407 B1 11/2009 Itkis et al. ..................... 463/29
7,611,409 B2 11/2009 Muir et al. ..................... 463/29
7,617,151 B2 11/2009 Rowe ............................ 705/39
7,618,317 B2 11/2009 Jackson
7,621,809 B2 11/2009 Baerlocher et al.
7,629,886 B2 12/2009 Steeves ..................... 340/572.1
7,634,550 B2 12/2009 Wolber et al. ............... 709/220
7,637,810 B2 12/2009 Amaitis et al. ................ 463/25
7,644,861 B2 1/2010 Alderucci et al. ........... 235/382
7,648,414 B2 1/2010 McNutt et al. ................ 463/25
7,666,081 B2 2/2010 Baerlocher et al.
7,674,179 B2 3/2010 Baerlocher et al.
7,682,249 B2 3/2010 Winans et al. ................. 463/31
7,684,874 B2 3/2010 Schlottmann et al. .......... 700/9
7,684,882 B2 3/2010 Baerlocher et al.
7,685,516 B2 3/2010 Fischer
7,685,593 B2 3/2010 Solomon et al. ............ 717/170
7,686,688 B2 3/2010 Friedman et al. ............. 463/25
7,688,322 B2 3/2010 Kapler et al.
7,689,302 B2 3/2010 Schlottmann et al.
7,690,995 B2 4/2010 Frankulin et al. ............. 463/41
7,699,697 B2 4/2010 Darrah et al. ................. 463/16
7,699,703 B2 4/2010 Muir et al. ..................... 463/29
7,702,719 B1 4/2010 Betz et al.
7,706,895 B2 4/2010 Callaghan
7,712,050 B2 5/2010 Gutberlet et al.
7,722,453 B2 5/2010 Lark et al. ..................... 463/16
7,730,198 B2 6/2010 Ruppert et al. .............. 709/230
7,744,462 B2 6/2010 Grav et al. ..................... 463/27
7,747,741 B2 6/2010 Basani et al. ................ 709/224
7,753,789 B2 7/2010 Walker et al. ................. 463/42
7,753,790 B2 7/2010 Nguyen et al. ................ 463/42
7,762,888 B2 7/2010 Rowe ............................ 463/29
7,769,877 B2 8/2010 McBride et al. ............ 709/230
7,778,635 B2 8/2010 Crookham et al.
7,780,525 B2 8/2010 Walker et al. ................. 463/29
7,780,526 B2 8/2010 Nguyen et al. ................ 463/29
7,780,529 B2 8/2010 Rowe et al.
7,783,881 B2 8/2010 Morrow et al. ............. 713/165
7,785,204 B2 8/2010 Wells et al.
7,787,972 B2 8/2010 Schlottmann et al.
7,788,503 B2 8/2010 Gatto et al.
7,805,719 B2 9/2010 O'Neill
7,824,267 B2 11/2010 Cannon et al. ................ 463/42
7,828,649 B2 11/2010 Cuddy et al. .................. 463/26
7,828,661 B1 11/2010 Fish et al.
7,841,946 B2 11/2010 Walker et al.
7,844,944 B2 11/2010 Gutberlet et al.
7,846,020 B2 12/2010 Walker et al.
7,850,528 B2 12/2010 Wells
7,857,702 B2 12/2010 Hilbert
7,862,425 B2 1/2011 Cavagna
7,874,920 B2 1/2011 Hornik et al.
7,874,921 B2 1/2011 Baszucki et al. ............... 463/43
7,886,288 B2 2/2011 Breckner et al.
7,892,093 B2 2/2011 Kniesteadt et al.
7,898,679 B2 3/2011 Brack et al.
7,901,294 B2 3/2011 Walker et al.
7,908,486 B2 3/2011 Gatto et al.
7,918,735 B2 4/2011 Inamura
7,921,026 B2 4/2011 O'Cull et al.
7,921,405 B2 4/2011 Gupta et al.
7,937,464 B2 5/2011 Ruppert et al.
7,963,847 B2 6/2011 Baerlocher
7,980,954 B2 7/2011 Gagner et al.
7,993,199 B2 8/2011 Iddings et al.
8,025,574 B2 9/2011 Hilbert
8,028,046 B2 9/2011 Elliott et al.
8,033,913 B2 10/2011 Cockerille et al.
8,037,313 B2 10/2011 Hämäläinen et al.
8,051,180 B2 11/2011 Mazzaferri et al.
8,057,294 B2 11/2011 Pacey et al.
8,057,297 B2 11/2011 Silvestro et al.
8,070,583 B2 12/2011 Baerlocher et al.
8,073,657 B2 12/2011 Moore, III et al.
8,075,403 B2 12/2011 O'Brien et al.
8,117,461 B2 2/2012 Bigelow, Jr. et al.
8,147,316 B2 4/2012 Arezina et al.
8,147,334 B2 4/2012 Gatto et al.
8,171,155 B2 5/2012 Ruppert
8,177,634 B2 5/2012 Herrmann et al.
8,182,346 B2 5/2012 Herrmann et al.
8,185,423 B2 5/2012 Brook et al.
8,187,087 B2 5/2012 Herrmann et al.
8,187,101 B2 5/2012 Herrmann et al.
8,192,289 B2 6/2012 Herrmann et al.
8,197,340 B2 6/2012 Garvey et al.
8,197,344 B2 6/2012 Rathsack et al.
8,201,229 B2 6/2012 Ruppert et al.
8,246,466 B2 8/2012 Herrmann et al.
8,277,324 B2 10/2012 Herrmann et al.
8,285,740 B2 10/2012 Graham et al.
8,308,554 B2 11/2012 Rowe et al.
8,360,870 B2 1/2013 Herrmann et al.
8,366,550 B2 2/2013 Herrmann et al.
8,414,372 B2 * 4/2013 Cannon et al. ................ 463/16
8,512,150 B2 8/2013 Herrmann et al.
2001/0019966 A1 9/2001 Idaka ............................ 463/40
2002/0004824 A1 1/2002 Cuan et al.
2002/0111213 A1 8/2002 McEntee et al. .............. 463/42
2002/0113371 A1 8/2002 Snow ........................... 273/292
2002/0115487 A1 8/2002 Wells ............................ 463/42
2002/0119824 A1 8/2002 Allen
2002/0142844 A1 10/2002 Kerr
2002/0142846 A1 10/2002 Paulsen ......................... 463/43
2002/0144115 A1 10/2002 Lemay et al.
2002/0147047 A1 10/2002 Letovsky et al.
2002/0151363 A1 10/2002 Letovsky et al.
2002/0152120 A1 10/2002 Howington
2003/0004871 A1 1/2003 Rowe ............................ 705/39
2003/0032474 A1 2/2003 Kaminkow .................... 463/25
2003/0042679 A1 3/2003 Snow ........................... 273/292
2003/0064798 A1 4/2003 Grauzer et al. ................ 463/29
2003/0075869 A1 4/2003 Breeding et al. ............ 273/292
2003/0078103 A1 4/2003 LeMay et al. ................. 463/43
2003/0090064 A1 5/2003 Hoyt et al. .................. 273/292
2003/0104865 A1 6/2003 Itkis et al. ..................... 463/39
2003/0130024 A1 7/2003 Darby ........................... 463/13
2003/0134675 A1 7/2003 Oberberger
2003/0182414 A1 9/2003 O'Neill
2003/0185229 A1 10/2003 Shachar et al.
2003/0186739 A1 10/2003 Paulsen et al. ................ 463/25
2003/0195037 A1 10/2003 Vuong et al. .................. 463/29
2003/0203755 A1 10/2003 Jackson ......................... 463/42
2003/0206548 A1 11/2003 Bannai et al.
2003/0224858 A1 12/2003 Yoseloff et al. ............... 463/43
2003/0228912 A1 12/2003 Wells et al. .................... 463/43
2003/0232640 A1 12/2003 Walker et al. ................. 463/16
2003/0232651 A1 12/2003 Huard et al. ................... 463/42
2004/0002386 A1 1/2004 Wolfe et al.
2004/0002388 A1 1/2004 Larsen et al.
2004/0029635 A1 2/2004 Giobbi ........................... 463/30
2004/0043815 A1 3/2004 Kaminkow .................... 463/25
2004/0043820 A1 3/2004 Schlottmann .................. 463/43
2004/0048669 A1 3/2004 Rowe
2004/0048671 A1 3/2004 Rowe ............................ 463/42
2004/0064817 A1 4/2004 Shibayama et al.
2004/0068654 A1 4/2004 Cockerille et al. .......... 713/168
2004/0082385 A1 4/2004 Silva et al. .................... 463/40
2004/0087375 A1 5/2004 Gelinotte ....................... 463/47

(56) References Cited

U.S. PATENT DOCUMENTS

2004/0092310 A1 5/2004 Brosnan et al. ............... 463/42
2004/0098579 A1 5/2004 Nakano et al.
2004/0106452 A1 6/2004 Nguyen et al. ............... 463/42
2004/0110119 A1 6/2004 Riconda et al. ............. 434/350
2004/0127291 A1 7/2004 George et al. ................ 463/42
2004/0132529 A1 7/2004 Mkrtchyan et al. ........... 463/29
2004/0133485 A1 7/2004 Schoonmaker et al. ........ 705/30
2004/0142744 A1 7/2004 Atkinson et al. .............. 463/29
2004/0166940 A1 8/2004 Rothschild
2004/0169332 A1 9/2004 Grauzer et al. ........... 273/149 R
2004/0180721 A1 9/2004 Rowe
2004/0185936 A1 9/2004 Block et al. .................. 463/42
2004/0219982 A1 11/2004 Khoo et al. ................... 463/42
2004/0229682 A1 11/2004 Gelinotte ...................... 463/25
2004/0229684 A1 11/2004 Blackburn et al.
2004/0254993 A1 12/2004 Mamas
2004/0259618 A1 12/2004 Soltys et al. .................. 463/11
2005/0026680 A1 2/2005 Gururajan ..................... 463/25
2005/0027604 A1 2/2005 Bandy et al. .................. 705/22
2005/0043094 A1 2/2005 Nguyen et al. ............... 463/42
2005/0051965 A1 3/2005 Gururajan .................... 273/292
2005/0054408 A1 3/2005 Steil et al. .................... 463/11
2005/0054438 A1 3/2005 Rothschild et al. ........... 463/29
2005/0059479 A1 3/2005 Soltys et al. .................. 463/25
2005/0070358 A1 3/2005 Angell et al. ................. 463/39
2005/0080898 A1 4/2005 Block
2005/0116020 A1 6/2005 Smolucha et al. ........... 235/375
2005/0119052 A1 6/2005 Russell et al. ................ 463/42
2005/0124411 A1 6/2005 Schneider et al. ............ 463/29
2005/0146094 A1 7/2005 Soltys et al. ................ 273/292
2005/0153778 A1 7/2005 Nelson et al. ................ 463/42
2005/0164761 A1 7/2005 Tain ............................. 463/13
2005/0171808 A1 8/2005 Saenz et al.
2005/0176507 A1 8/2005 Ephrati ......................... 463/39
2005/0222891 A1 10/2005 Chan et al.
2005/0227760 A1 10/2005 Vlazny et al. ................ 463/28
2005/0239542 A1 10/2005 Olsen ............................ 463/27
2005/0266919 A1 12/2005 Rowe et al. .................. 463/25
2005/0282626 A1 12/2005 Manfredi et al. ............. 463/25
2005/0288083 A1 12/2005 Downs, III .................... 463/11
2006/0003828 A1 1/2006 Abecassis
2006/0004618 A1 1/2006 Brixius ........................... 705/8
2006/0009282 A1 1/2006 George et al. ................ 463/29
2006/0015716 A1 1/2006 Thornton et al.
2006/0019745 A1 1/2006 Benbrahim .................... 463/29
2006/0026499 A1 2/2006 Weddle
2006/0031763 A1 2/2006 Yeung
2006/0035707 A1 2/2006 Nguyen et al. ............... 463/29
2006/0046849 A1 3/2006 Kovacs ......................... 463/39
2006/0052169 A1 3/2006 Britt et al.
2006/0073888 A1 * 4/2006 Nguyen et al. ............... 463/27
2006/0116208 A1 6/2006 Chen et al. .................... 463/43
2006/0121970 A1 6/2006 Khal ............................. 463/16
2006/0172804 A1 8/2006 Acres et al.
2006/0183541 A1 8/2006 Okada et al. ................. 463/29
2006/0195847 A1 8/2006 Amano et al.
2006/0205508 A1 9/2006 Green ........................... 463/40
2006/0217202 A1 9/2006 Burke et al.
2006/0247013 A1 11/2006 Walker et al. ................ 463/20
2006/0247057 A1 11/2006 Green et al. .................. 463/42
2006/0252530 A1 11/2006 Oberberger et al.
2006/0253702 A1 11/2006 Lowell et al.
2006/0259604 A1 11/2006 Kotchavi et al.
2006/0277487 A1 12/2006 Poulsen et al. .............. 715/772
2006/0287098 A1 12/2006 Morrow et al.
2007/0004501 A1 1/2007 Brewer et al.
2007/0015583 A1 1/2007 Tran ............................. 463/40
2007/0026935 A1 2/2007 Wolf et al.
2007/0026942 A1 2/2007 Kinsley et al.
2007/0032288 A1 2/2007 Nelson et al.
2007/0033247 A1 2/2007 Martin
2007/0054725 A1 3/2007 Morrow et al. ............... 463/16
2007/0054740 A1 3/2007 Salls et al. ................... 463/42
2007/0057453 A1 3/2007 Soltys et al. ............. 273/149 P
2007/0057454 A1 3/2007 Fleckenstein ............ 273/149 R
2007/0057469 A1 3/2007 Grauzer et al. .............. 273/309
2007/0060225 A1 3/2007 Hosogai et al.
2007/0060259 A1 3/2007 Pececnik ....................... 463/16
2007/0060260 A1 3/2007 Fleckenstein ................. 463/16
2007/0060307 A1 3/2007 Mathis et al. ................ 463/25
2007/0060320 A1 3/2007 Kelly et al.
2007/0060354 A1 3/2007 Themer et al.
2007/0060365 A1 3/2007 Tien et al. ..................... 463/42
2007/0077995 A1 4/2007 Oak et al.
2007/0082737 A1 4/2007 Morrow et al. ............... 463/42
2007/0093298 A1 4/2007 Brunet .......................... 463/42
2007/0105628 A1 5/2007 Arbogast et al. .............. 463/42
2007/0111775 A1 5/2007 Yoseloff ........................ 463/16
2007/0111791 A1 5/2007 Arbogast et al. .............. 463/40
2007/0111794 A1 5/2007 Hogan et al. ................. 463/42
2007/0117608 A1 5/2007 Roper et al. .................. 463/16
2007/0118844 A1 5/2007 Huang et al.
2007/0123346 A1 5/2007 Perez et al.
2007/0124483 A1 5/2007 Marples et al.
2007/0129145 A1 6/2007 Blackburn et al. ............ 463/42
2007/0139683 A1 6/2007 Wegeng et al.
2007/0155490 A1 7/2007 Phillips et al.
2007/0167235 A1 7/2007 Naicker ........................ 463/42
2007/0191102 A1 8/2007 Coliz et al. ................... 463/42
2007/0192748 A1 8/2007 Martin et al. ................ 715/856
2007/0197298 A1 8/2007 Rowe
2007/0198418 A1 8/2007 MacDonald et al. ........... 705/52
2007/0208816 A1 9/2007 Baldwin et al. ............. 709/206
2007/0214030 A1 9/2007 Shear et al.
2007/0218998 A1 9/2007 Arbogast et al. .............. 463/42
2007/0235521 A1 10/2007 Mateen et al. ............... 235/379
2007/0238526 A1 10/2007 Chandranmenon
2007/0241497 A1 10/2007 Soltys et al. ............. 273/149 R
2007/0241498 A1 10/2007 Soltys ...................... 273/149 R
2007/0243925 A1 10/2007 LeMay et al. ................ 463/20
2007/0243927 A1 10/2007 Soltys ........................... 463/25
2007/0243935 A1 10/2007 Huizinga ....................... 463/42
2007/0259709 A1 * 11/2007 Kelly et al. ................... 463/20
2007/0259711 A1 11/2007 Thomas ......................... 463/22
2007/0265092 A1 11/2007 Betteridge
2007/0287535 A1 12/2007 Soltys ........................... 463/29
2007/0298865 A1 12/2007 Soltys ........................... 463/22
2007/0298868 A1 12/2007 Soltys ........................... 463/25
2008/0004108 A1 1/2008 Klinkhammer ................ 463/29
2008/0009344 A1 1/2008 Graham et al.
2008/0026832 A1 1/2008 Stevens et al.
2008/0026848 A1 1/2008 Byng
2008/0038035 A1 2/2008 Shuldman et al. ............ 400/76
2008/0045341 A1 2/2008 Englman
2008/0045342 A1 2/2008 Crowder, Jr. et al.
2008/0058105 A1 3/2008 Combs et al.
2008/0064501 A1 * 3/2008 Patel ...................... G07F 17/32
463/40
2008/0065590 A1 3/2008 Castro et al.
2008/0076572 A1 3/2008 Nguyen et al. ............... 463/42
2008/0090651 A1 4/2008 Baerlocher .................... 463/27
2008/0091490 A1 4/2008 Abrahams et al.
2008/0096659 A1 4/2008 Kreloff et al. ................ 463/39
2008/0102919 A1 5/2008 Rowe et al.
2008/0102932 A1 5/2008 Anderson et al.
2008/0108405 A1 5/2008 Brosnan et al.
2008/0108433 A1 5/2008 DiMichele et al. ............ 463/40
2008/0113764 A1 5/2008 Soltys ........................... 463/22
2008/0113772 A1 5/2008 Burrill et al.
2008/0113773 A1 5/2008 Johnson et al.
2008/0113781 A1 5/2008 Soltys et al. .................. 463/28
2008/0119284 A1 5/2008 Luciano et al. ............... 463/42
2008/0126803 A1 5/2008 Ginter et al.
2008/0127174 A1 5/2008 Johnson
2008/0146337 A1 6/2008 Halonen et al. ............... 463/42
2008/0153599 A1 6/2008 Atashband et al. ............ 463/42
2008/0153600 A1 6/2008 Swarna .......................... 463/43
2008/0154916 A1 6/2008 Atashband ..................... 707/10
2008/0155665 A1 6/2008 Ruppert et al. ................. 726/5
2008/0162729 A1 7/2008 Ruppert ....................... 709/249
2008/0165771 A1 7/2008 Gainey et al.
2008/0171588 A1 7/2008 Atashband ..................... 463/20
2008/0171598 A1 7/2008 Deng ............................ 463/40
2008/0171602 A1 * 7/2008 Patel et al. ................... 463/42

(56) References Cited

U.S. PATENT DOCUMENTS

| | | | | |
|---|---|---|---|---|
| 2008/0200255 | A1 | 8/2008 | Eisele | 463/42 |
| 2008/0243697 | A1 | 10/2008 | Irving et al. | 705/54 |
| 2008/0244565 | A1 | 10/2008 | Levidow et al. | |
| 2008/0261699 | A1 | 10/2008 | Topham et al. | |
| 2008/0261701 | A1 | 10/2008 | Lewin et al. | |
| 2008/0287197 | A1 | 11/2008 | Ruppert et al. | 463/42 |
| 2008/0293494 | A1 | 11/2008 | Adiraju et al. | |
| 2008/0300046 | A1 | 12/2008 | Gagner et al. | |
| 2008/0311971 | A1 | 12/2008 | Dean | 463/20 |
| 2008/0313282 | A1 | 12/2008 | Warila et al. | |
| 2008/0318655 | A1 | 12/2008 | Davies | |
| 2008/0318685 | A9 | 12/2008 | Oak et al. | |
| 2008/0318686 | A1* | 12/2008 | Crowder et al. | 463/42 |
| 2009/0005176 | A1 | 1/2009 | Morrow et al. | 463/43 |
| 2009/0005177 | A1 | 1/2009 | Kishi et al. | |
| 2009/0011833 | A1 | 1/2009 | Seelig et al. | |
| 2009/0029775 | A1 | 1/2009 | Ruppert et al. | 463/42 |
| 2009/0029776 | A1 | 1/2009 | Ruppert et al. | 463/42 |
| 2009/0054139 | A1 | 2/2009 | Anderson | |
| 2009/0063309 | A1 | 3/2009 | Stephens | |
| 2009/0069090 | A1 | 3/2009 | Moser et al. | |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118006 | A1 | 5/2009 | Kelly et al. | 463/31 |
| 2009/0124329 | A1 | 5/2009 | Palmisano | |
| 2009/0124350 | A1* | 5/2009 | Iddings et al. | 463/25 |
| 2009/0124392 | A1 | 5/2009 | Ruppert et al. | 463/42 |
| 2009/0124394 | A1 | 5/2009 | Swarna | 463/43 |
| 2009/0125603 | A1 | 5/2009 | Atashband et al. | 709/207 |
| 2009/0131144 | A1 | 5/2009 | Allen | 463/20 |
| 2009/0131163 | A1 | 5/2009 | Arbogast et al. | 463/29 |
| 2009/0132720 | A1 | 5/2009 | Ruppert et al. | 709/231 |
| 2009/0156313 | A1 | 6/2009 | Blackburn et al. | |
| 2009/0163279 | A1 | 6/2009 | Hermansen et al. | 463/42 |
| 2009/0170594 | A1 | 7/2009 | Delaney et al. | 463/25 |
| 2009/0176568 | A1* | 7/2009 | Reddy et al. | 463/31 |
| 2009/0176578 | A1 | 7/2009 | Herrmann et al. | |
| 2009/0181776 | A1 | 7/2009 | Deng | 463/42 |
| 2009/0239667 | A1 | 9/2009 | Rowe et al. | |
| 2009/0270170 | A1 | 10/2009 | Patton | 463/36 |
| 2009/0275374 | A1 | 11/2009 | Nelson et al. | 463/16 |
| 2009/0275393 | A1 | 11/2009 | Kisenwether et al. | 463/25 |
| 2009/0275394 | A1 | 11/2009 | Young et al. | 463/25 |
| 2009/0275398 | A1 | 11/2009 | Nelson | 463/27 |
| 2009/0275399 | A1 | 11/2009 | Kelly et al. | 463/27 |
| 2009/0275400 | A1 | 11/2009 | Rehm et al. | 463/27 |
| 2009/0275401 | A1 | 11/2009 | Allen et al. | 463/29 |
| 2009/0275402 | A1 | 11/2009 | Backover et al. | 463/29 |
| 2009/0275410 | A1 | 11/2009 | Kisenwether et al. | 463/42 |
| 2009/0275411 | A1 | 11/2009 | Kisenwether et al. | 463/42 |
| 2009/0276341 | A1 | 11/2009 | McMahan et al. | 705/30 |
| 2009/0276715 | A1 | 11/2009 | Arbogast et al. | 715/736 |
| 2009/0298575 | A1 | 12/2009 | Hopkins et al. | |
| 2009/0298583 | A1 | 12/2009 | Jones | 463/29 |
| 2009/0307069 | A1 | 12/2009 | Meyerhofer | 705/14.12 |
| 2009/0325708 | A9 | 12/2009 | Kerr | |
| 2009/0325716 | A1 | 12/2009 | Harari | |
| 2010/0016067 | A1 | 1/2010 | White et al. | 463/25 |
| 2010/0016068 | A1 | 1/2010 | White et al. | 463/25 |
| 2010/0022299 | A1 | 1/2010 | Ryan | |
| 2010/0048291 | A1 | 2/2010 | Warkentin | |
| 2010/0058320 | A1 | 3/2010 | Milligan et al. | |
| 2010/0062835 | A1 | 3/2010 | Hopkins | |
| 2010/0062838 | A1 | 3/2010 | Nguyen et al. | |
| 2010/0087247 | A1* | 4/2010 | Joshi et al. | 463/29 |
| 2010/0093440 | A1 | 4/2010 | Burke | |
| 2010/0093441 | A1 | 4/2010 | Rajaraman et al. | 463/42 |
| 2010/0124990 | A1 | 5/2010 | Crowder | 463/42 |
| 2010/0125851 | A1 | 5/2010 | Singh et al. | 718/104 |
| 2010/0131772 | A1 | 5/2010 | Atashband et al. | 713/189 |
| 2010/0151926 | A1 | 6/2010 | Ruppert et al. | 463/1 |
| 2010/0161798 | A1 | 6/2010 | Ruppert et al. | 709/225 |
| 2010/0210353 | A1 | 8/2010 | Gagner et al. | |
| 2010/0234104 | A1 | 9/2010 | Ruppert et al. | 463/30 |
| 2011/0009184 | A1 | 1/2011 | Byng | |
| 2011/0009188 | A1* | 1/2011 | Adiraju et al. | 463/25 |
| 2011/0059800 | A1* | 3/2011 | Anderson et al. | 463/42 |
| 2011/0111826 | A1 | 5/2011 | Baerlocher et al. | |
| 2011/0124417 | A1 | 5/2011 | Baynes et al. | |
| 2011/0179409 | A1 | 7/2011 | Yoseloff et al. | |
| 2011/0269534 | A1 | 11/2011 | Kelly et al. | |
| 2012/0047046 | A1* | 2/2012 | Mengerink et al. | 705/26.41 |
| 2012/0110649 | A1 | 5/2012 | Murphy | |
| 2012/0115616 | A1 | 5/2012 | Phillips et al. | |
| 2012/0203692 | A1* | 8/2012 | Olliphant et al. | 705/39 |

FOREIGN PATENT DOCUMENTS

| | | | |
|---|---|---|---|
| EP | 1291045 | A2 | 3/2003 |
| EP | 1463008 | A2 | 9/2004 |
| GB | 2380143 | A | 4/2003 |
| JP | 8255059 | | 10/1996 |
| KR | 2001-0084838 | | 9/2001 |
| KR | 2002-0061793 | | 7/2002 |
| KR | 2003-0091635 | | 12/2003 |
| WO | 96/03188 | A1 | 2/1996 |
| WO | 96/36253 | A1 | 11/1996 |
| WO | 97/13227 | A1 | 4/1997 |
| WO | 02/05914 | A1 | 1/2002 |
| WO | 03/060846 | A2 | 7/2003 |
| WO | 2005/035084 | | 4/2005 |
| WO | 2007/033207 | A2 | 3/2007 |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bulaysky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

Hewlett Packard Handhelds, accessed Sep. 8, 2003, URL = http:/www.shopping.hp.com/cgi-bin/hpdirect/shopping/scripts/home/store_access.jsp?temp . . . , 2 pages.

International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.

International Search Report, mailed Jan. 13, 2010, for PCT/US2009/045466, 3 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Palermo, V. "Near-field magnetic comms emerges," EE Times Design, Oct. 31, 2003.

Semtek PDA & Handheld Devices, Compaq iSwipe™ Magnetic Card Reader, accessed Sep. 8, 2003, URL = http:/www.semtek.com/products/iswipe.html, 3 pages.

Terdiman, D., "Who's Holding the Aces Now?", reprinted from *Wired News*, Aug. 18, 2003, 2 pages.

Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.

Winkler, C., "Product Spotlight: MindPlay," reprinted from *Gaming and Leisure Technology*, Fall 2003, 2 pages.

Written Opinion, mailed Jan. 13, 2010, for PCT/US2009/045466, 3 pages.

(56) References Cited

OTHER PUBLICATIONS

"BOB and LDAP," Gaming Standards Association, Fremont, California, 7 pages, Oct. 26, 2003.
"GSA Point-to-Point SOAP/HTTPS Transport and Security Specification v1.0.3," Gaming Standards Association TRANSPORT Technical Committee, 16 pages, Jun. 5, 2007.
Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.
Requirements document, "Game Authentication Terminal Program (GAT3)," to Gaming Standards Association, Aug. 2005, 27 pages.
Standards document, "Technical Standards for Gaming Devices and On-Line Slot Systems," to Nevada Gaming Commission and State Gaming Control Board, Aug. 17, 2005, 15 pages.
Hung et al., "Performance Evaluation of the Least Conflict Sharable Spreading Code Assignment Algorithm," IEEE, 1996, 5 pages.
Olesiejuk, "Discovery Services for Gaming Devices on a Casino Floor," Gaming Standards Association, 3 pages, Mar. 12, 2007.
Lewis, "The 12 Commandments of File Sharing," Windows IT Pro, Apr. 26, 2004, obtained from http://windowsitpro.com/security/12-commandments-file-sharing on Feb. 27, 2015, 6 pages.

* cited by examiner

WEB PAGES FOR GAMING DEVICES

CROSS-REFERENCE(S) TO RELATED APPLICATION(S)

This application claims the benefit under 35 U.S.C. §119 (e) of U.S. Provisional Patent Application Ser. No. 61/057,306, filed May 30, 2008.

BACKGROUND

1. Technical Field

This description generally relates to the field of gaming devices, and more particularly to enabling interaction with Web pages on gaming devices.

2. Description of the Related Art

Gaming properties often devote a large percentage of floor space to gaming devices. Each gaming device presents players with individual games of chance, games of skill, or combinations thereof that they may wager on.

In the past, each gaming device would present a player with only one such game, and the player would then choose from among the available gaming devices to find her preferred game. In order to provide even greater choices to modern gaming property patrons, many gaming devices now comprise general purpose computing devices, and each gaming device can therefore offer an array of gaming choices to players. For example, a single gaming device may offer video poker, video blackjack and video slots.

Unfortunately, gaming regulations in many jurisdictions continue to place practical limits on the gaming flexibility of each gaming device. For example, in many jurisdictions, each update to the software stored on a gaming device faces regulatory review, and these regulatory reviews can take months. Thus, if a gaming property wishes to launch a new game on its existing gaming devices, this simple software update may suffer from lengthy delays. Moreover, it is practically impossible to update the games available on gaming devices based on "real-time" events.

Therefore, it would be desirable to make game play even more flexible to enhance players' experiences at gaming properties.

BRIEF SUMMARY

In accordance with one embodiment, a method of enabling interaction with Web pages in a gaming property is disclosed. The method may comprise: providing a Web page from a Web server device to a gaming device; displaying the Web page to a player at the gaming device; receiving information indicative of a player's interaction with the Web page at the Web server device; sending a request from the Web server device to a gaming property server device based at least in part on the interaction; sending a reply from the gaming property server device to the Web server device; providing Web content from the Web server device to the gaming device based at least in part on the reply; and changing a display of the gaming device based at least in part on the Web content.

In accordance with one embodiment, the gaming property server device may comprise a transaction server device, the request sent from the Web server device may comprise a first transaction request, and the reply sent from the transaction server device may comprise a first transaction reply. The method may further comprise: sending a second transaction request from the transaction server device to the gaming device based at least in part on the first transaction request, and sending a second transaction reply from the gaming device to the transaction server device.

In accordance with one embodiment, the method may further comprise authenticating the gaming device.

In accordance with yet another embodiment, another method of enabling interaction with Web pages in a gaming property is disclosed. The method may comprise: providing a Web page from a Web server device to a gaming device; receiving information indicative of a player's interaction with the Web page at the Web server device; sending a request from the Web server device to a gaming property server device based at least in part on the interaction; receiving a reply from the gaming property server device at the Web server device; and providing Web content from the Web server device to the gaming device based at least in part on the reply.

In accordance with one embodiment, the gaming property server device may comprise a transaction server device, the request sent from the Web server device may comprise a transaction request, and the reply received at the Web server device may comprise a transaction reply.

In accordance with another embodiment, the method may further comprise authenticating the gaming device.

In accordance with still another embodiment, a server device computer for enabling interaction with Web pages in a gaming property is disclosed. The server device computer may include a processor that executes instructions and a computer-readable memory. The computer-readable memory may store instructions that cause the processor to enable interaction with Web pages by: providing a Web page to an authenticated gaming device; receiving information indicative of a player's interaction with the Web page; sending a request to a gaming property server device based at least in part on the interaction; receiving a reply from the gaming property server device; and providing Web content to the gaming device based at least in part on the reply.

In accordance with one embodiment, the gaming property server device may comprise a transaction server device, the request sent from the Web server device may comprise a transaction request, and the reply received at the Web server device may comprise a transaction reply.

In accordance with yet another embodiment, a computer-readable medium that stores instructions is disclosed. The instructions may cause a processor to enable interaction with Web pages in a gaming property by: providing a Web page to an authenticated gaming device; receiving information indicative of a player's interaction with the Web page; sending a request to a gaming property server device based at least in part on the interaction; receiving a reply from the gaming property server device; and providing Web content to the gaming device based at least in part on the reply.

In accordance with one embodiment, the gaming property server device may comprise a transaction server device, the request sent from the Web server device may comprise a transaction request, and the reply received at the Web server device may comprise a transaction reply.

In accordance with another embodiment, another computer-implemented method of enabling interaction with Web pages in a gaming property is disclosed. The method may comprise: displaying a primary wagering game on a main display of a gaming device; providing a Web page from a Web server device to the gaming device; displaying the Web page on a secondary display of the gaming device while the primary wagering game is displayed on the main display; receiving information indicative of a player's interaction with the Web page at the Web server device; sending a request from the Web server device to a gaming property server device based at least in part on the interaction; sending a reply from the gaming property server device to the Web server device; providing Web content from the Web server device to the gaming device based at least in part on the reply; and changing the secondary display of the gaming device based at least in part on the Web content.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with gaming properties, gaming devices, games of chance, Web pages and Web server devices, gaming property server devices and network communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Exemplary Gaming Property

Figure 1:
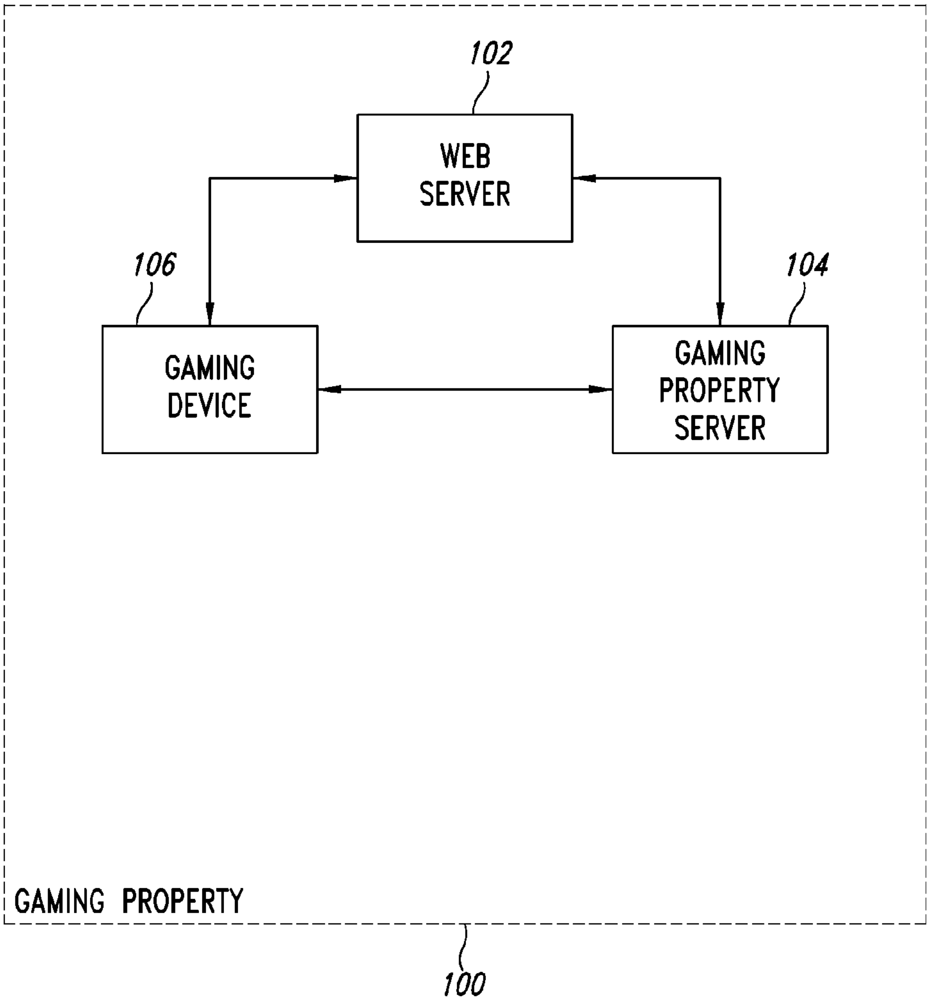
FIG. 1 is a schematic view of a gaming property including a Web server device and a gaming property server device communicatively coupled to a gaming device, according to one illustrated embodiment.

FIG. 1 shows a gaming property 100 including a Web server device 102 and a gaming property server device 104 communicatively coupled to each other as well as to a gaming device 106. Although a single gaming device 106 is illustrated in FIG. 1, more gaming devices may be included in other embodiments. Moreover, the gaming property 100 may also include a number of Web server devices 102 and other gaming property server devices 104 offering a variety of services.

The gaming property 100 may comprise any of a variety of establishments housing at least one gaming device 106 used for gaming/gambling. In one embodiment, the gaming property 100 may be a casino. However, even convenience stores or gas stations having one or more gaming devices may comprise the gaming property 100.

As illustrated, a network may be formed within the gaming property 100 between the Web server device 102, the gaming property server device 104 and the gaming device 106. This network may comprise any of a variety of networks and related hardware and/or software. In some embodiments, the network may comprise a wired or wireless enterprise-wide computer network, intranet, extranet or the Internet.

The gaming device 106 may comprise any of a variety of electronic devices offering primary games of chance, games of skill, or combinations thereof that a player may wager on. Such primary games may be stored locally on the gaming device 106, and may include mechanical slots, video slots, video keno, video poker, video blackjack, Class II bingo, lottery, craps, a mechanical or video representation of a wheel game, etc. The gaming device 106 may have a variety of configurations, but some example structures and configurations for the gaming device 106 are discussed in greater detail below with reference to FIGS. 5-8.

In one embodiment, the gaming device 106 may also be configured to display Web pages on at least one display associated with the gaming device 106. As used herein, it may be understood that a "Web page" is a general term referring to a document or other information/data (e.g., electronic or digital) received over a network that is properly formatted for display by a Web browser. For example, a Web page may include a document formatted in hypertext markup language (HTML), extensible hypertext markup language (XHTML), extensible markup language (XML), etc., and may be received via hypertext transfer protocol (HTTP) or secure hypertext transfer protocol (HTTPS). In one embodiment, the Web page may further include dynamic Web content, such as audio, video, scripts or other Web-based applications. Web-based applications provided via a Web page may be executed on a Web server device providing the Web page or on the gaming device 106 itself. In one embodiment, a Web page displayed by the gaming device 106 may include Flash animations, digital video, Java Applets, JavaScript, Scalable Vector Graphics (SVG) scripts, Perl scripts, ActiveX controls, Ajax-compatible technologies, etc.

In one embodiment, the gaming device 106 executes a Web browser application (i.e., "Web browser") to enable the display of such Web pages. The Web browser may comprise any of a variety of proprietary or publicly available Web browsers. For example, the Web browser may comprise the Internet Explorer browser by Microsoft, the Firefox browser by Mozilla, the Safari browser by Apple, or the Opera browser by Opera Software.

The Web pages displayed on the gaming device 106 may include a variety of different content. For example, the Web pages may include secondary wagering games of skill or chance, entertainment games that do not accept wagers, promotional offers, advertisements, concierge-type services, transaction-related content, and more. In one embodiment, a player at the gaming device 106 may interact with the Web pages such that, for example, she may play a game, make selections, generate search queries or navigate between Web pages. Some examples of the wide variety of Web pages and interactive possibilities are described in greater detail below.

In one embodiment, the gaming device 106 may display a Web page including a secondary wagering game. This secondary wagering game may be offered to the player as an addition to those primary wagering games that are locally stored on the gaming device 106. In order to navigate to the Web page including the secondary wagering game, the gaming device 106 may initially display a portal Web page containing at least one link to the secondary wagering game. A player at the gaming device 106 may then select the secondary wagering game from the portal Web page, and the Web page including the secondary wagering game may then be displayed. The secondary wagering game may comprise any of a variety of games, including: video slots, video keno, video poker, video blackjack, bingo, lottery, craps, a video representation of a wheel game, a sports book, etc.

In one embodiment, the user interfaces of the gaming device 106 that are used to place wagers on the primary wagering games may also be used to place wagers on the secondary wagering game. For example, the Web page may be displayed on a touch screen display of the gaming device 106, and the player may interact directly with the touch screen display in order to play the secondary wagering games.

To simplify a player's interactions with the gaming device 106, the credit meter of the gaming device 106 that is the source for wagers on the primary wagering games may also be used as the source for wagers on the secondary wagering game. Moreover, in one embodiment, the currency acceptors of the gaming device 106 may be used to add to the credit meter for either the primary or secondary wagering games. Of course, in other embodiments, different credit meters may be used for the primary and secondary wagering games, and different ways of funding these games may be used.

In another embodiment, the gaming device 106 may display a Web page including an entertainment game that does not accept wagers. The entertainment game may comprise any of a variety of games that a player may interact with, such as: Solitaire, FreeCell, Hearts, Chess, Mahjong, Tetris, etc. These entertainment games may be played against a "computer opponent," or against human players (within or outside the gaming property 100). In one embodiment, an entertainment game may be selected that a player might interact with briefly while wagering on the primary wagering game of the gaming device 106. The gaming device 106 may enable interaction with the Web page including the entertainment game in a manner similar to that described above with reference to the secondary wagering game.

In yet another embodiment, the gaming device 106 may display a Web page including a promotional offer. The promotional offer may be personalized to the player currently interacting with the gaming device 106 in one embodiment. However, in other embodiments, more generic promotional offers may be displayed. The promotional offer may comprise any of a variety of offers, including offers for room upgrades, bonus cash or credits, free or discounted accommodations, meals or travel, etc.

In one embodiment, a player may choose to accept a promotional offer and may even redeem the promotional offer by interacting with the Web page displayed on the gaming device 106. For example, in one embodiment, after accepting a promotional offer for bonus credits, the credits may be transferred to the credit meter on the gaming device 106. In another embodiment, after accepting a different promotional offer, the gaming device 106 may be configured to send an electronic confirmation to a player's e-mail address (entered via the Web page) or may be configured to print out a confirmation voucher.

In another embodiment, the gaming device 106 may display a Web page including advertisements/marketing materials. As described above, these advertisements may be personalized to the player at the gaming device 106 or may be generic. The Web page may also be interactive, such that a player may be able to obtain more information about an advertised product, or even place orders or make reservations via the Web page.

In still another embodiment, the gaming device 106 may display a Web page offering concierge-type services. This Web page may enable a player to accomplish a number of concierge-type tasks. For example, the player may be able to find nearby restaurants meeting certain criteria, make dining reservations, find and reserve lodging, find and reserve airline flights, etc. As described above, the gaming device 106 may also allow the player to print out or e-mail confirmations when the player has completed such tasks.

In yet another embodiment, the gaming device 106 may display a Web page including transaction-related content. For example, a player may be able to access credit/debit card accounts via the Web page in order to initiate money transfers to the gaming device 106 or to a player account at the gaming property 100. In another embodiment, the Web page may facilitate the use of certain identification verification technologies. For example, the player may insert a credit/debit card or player club card into a card reader of the gaming device 106, and a Web page may request that the player enter a personal identification number (PIN), some biometric identification (e.g., a retinal scan or fingerprints), or other identifying information. In this way, the Web page may facilitate the transfer of funds to and from the gaming device 106 to facilitate wagering on primary or secondary wagering games.

Navigation between the Web pages displayed on the gaming device 106 may be accomplished in a typical manner, with the Web pages including links to other Web pages. For example, the gaming device 106 may initially load a portal Web page containing links to a variety of other Web pages. In such an embodiment, the portal Web page may be easily updated with links to different Web content. In another embodiment, a navigation screen displayed on the gaming device 106 may be locally generated, the navigation screen including links to various Web pages. This navigation screen may be periodically updated to include links to the latest updated Web sites. Other methods of navigation may also be used, and a player may even be able to directly enter the address of a desired Web page.

The Web page may be displayed on any of a variety of displays associated with the gaming device 106. In one embodiment, the Web page may be displayed on a main display of the gaming device 106 and may replace or overlay a primary wagering game. In another embodiment, the Web page may be displayed on a secondary display of the gaming device 106, such that a player may interact with the Web page while simultaneously engaging the primary game.

Any or all of the Web pages described above may be provided by the Web server device 102. However, in other embodiments, a plurality of Web server devices 102 may provide different Web pages. Indeed, some of the Web server devices 102 may be located beyond the gaming property 100 and may deliver the Web pages via the Internet.

The Web server device 102 may comprise any processor (e.g., microprocessor, digital signal processor, field programmable gate array, application specific integrated circuits), or other device that executes a variety of server software or firmware applications operable to serve one or more Web pages to the gaming device 106. Some widely available Web server applications include the Apache Web server and Internet Information Services by Microsoft. As used herein, it may be understood that the term "server" refers to the server application and not to a server computer, unless the context clearly dictates otherwise, while the terms "server device" or "server computer" refer to a physical device that executes a server application. For example, in one embodiment, the Web server device 102 and the gaming property server device 104 may be a Web server application and gaming server application hosted on the same physical computer or even the same physical processor, although the two are illustrated as separate server blocks.

As described above in detail, the Web server device 102 may provide any of a variety of Web pages to the gaming device 106. These Web pages may be formatted in any of a variety of markup languages and may be served via HTTP or HTTPS protocol. The Web server device 102 may also be configured to provide a variety of associated Web content to the gaming device 106. As used herein, the term "Web content" is a broad term referring to any data and/or information received over a network by a Web browser. Web content includes Web pages, audio, video, scripts and other Web-based applications, as well as information that is sent back and forth to the scripts and other Web-based applications. In many embodiments, the Web content may change an appearance of the Web page displayed on the gaming device 106. However, in other embodiments, the Web content may modify information in the background, and such a modification may or may not be reflected in visible changes.

In one embodiment, the Web pages served by the Web server device 102 may be relatively dynamic and may be modified based on content available from a variety of other servers, such as the gaming property server device 104. For example, the Web server device 102 may generate a Web page based on information associated with a player before providing the Web page to the gaming device 106. Thus, for example, the Web page may include a personalized greeting or may wish a player a "Happy Birthday." As another example, if betting on a sporting event is about to close, the Web server device 102 may be able to generate and provide a corresponding Web page enabling participation by players at one or more gaming devices 106.

As illustrated in FIG. 1, a gaming property server device 104 may also be communicatively coupled to the gaming device 106 and the Web server device 102. The gaming property server device 104 may comprise any of a variety of server applications executed by a processor or other device that are operable to provide services to the Web server device 102. As described in greater detail below, the gaming property server device 104 may be configured to answer requests from and provide information to the Web server device 102. Based at least in part on this information, the Web server device 102 may then provide Web content to the gaming device 106. Indeed, in some embodiments, the gaming property server device 104 may be communicatively coupled only to the Web server device 102 and may not provide any services to the gaming device 106.

In one embodiment, the gaming property server device 104 may be communicatively coupled with the Web server device 102 in accordance with a relatively secure, well-defined communications protocol, such as the System to System (S2S) protocol. The S2S protocol is a communications protocol agreed upon by the Gaming Standards Association and provides a limited set of commands and messages that may be passed back and forth between server applications within the gaming property 100. In one embodiment, the S2S protocol may be realized using HTTP. Of course, in other embodiments, other protocols (including proprietary protocols) may be used to facilitate communications between the gaming property server device 104 and the Web server device 102.

The gaming property server device 104 may also be communicatively coupled with the gaming device 106 in accordance with a relatively secure, well-defined communications protocol, such as the Game to System (G2S) protocol. The G2S protocol is another communications protocol agreed upon by the Gaming Standards Association and provides a limited set of commands and messages that may be passed back and forth between a gaming device and a gaming property server device. In one embodiment, the G2S protocol may be realized using HTTP. Of course, in other embodiments, other protocols (including proprietary protocols) may be used to facilitate communications between the gaming property server device 104 and the gaming device 106.

In one embodiment, the gaming property server device 104 may comprise a transaction server device operable to carry out financial and other transactions with the gaming device 106. The transaction server device may, for example, be capable of transferring money to and from the gaming device 106, changing sounds associated with the primary game, changing a brightness of a primary game display, changing a language option associated with the gaming device 106, changing a font size of the primary game display, etc. The transaction server device may also be operable to initiate transactions with and provide information regarding such transactions to other gaming property server applications (such as the Web server device 102). In such an embodiment, the Web server device 102 may leverage the utility provided by the transaction server device in order to enable a player at the gaming device 106 to place wagers associated with Web content, to make purchases, or to change one or more characteristics of the gaming device.

For example, as described above, one of the Web pages provided by the Web server device 102 may include a secondary wagering game. A player at the gaming device 106 may interact with the Web page, requesting to place a wager on the secondary wagering game, and information indicative of the player's interaction may be sent to the Web server device 102. The Web server device 102, in turn, may send a transaction request to the transaction server device (e.g., via the S2S protocol) indicating an amount of the requested wager. In one embodiment, the transaction server device may then directly debit a player account at the gaming property 100. Alternatively, the transaction server device may direct its own transaction request for the amount of the requested wager to the gaming device 106 (e.g., via the G2S protocol). The gaming device 106 may then subtract the amount of the wager from credits purchased by the player at the gaming device 106. Once the wager amount has been subtracted, an affirmative transaction reply may be sent to the transaction server device, and the transaction server device may then send an affirmative transaction reply to the Web server device 102. Based on the affirmative transaction reply, the Web server device 102 may provide Web content to the gaming device 106. For example, the Web server device 102 may communicate with a Web-based application comprising the secondary wagering game in order to enable the player to play the game for the wagered amount.

In another embodiment, the gaming property server device 104 may comprise a player tracker server device operable to store a variety of information concerning players at the gaming property 100. This player tracker server device may receive information from different databases as well as from the gaming devices 106 and may provide the player information to requesting gaming property entities (such as the Web server device 102). Such player information may include: player session information (information indicative of the wagers that have been placed by a player, the jackpots that have been won, the amount of time that the player has been playing, etc.), biographical information (name, birthday, address, phone number, marital status, etc.), player status information (VIP status at the gaming property 100, frequency of visits to the gaming property 100, amounts wagered at the gaming property 100, promotional awards for which the player is eligible, etc.), gaming device preference information (language preference, sound preference, font preference, brightness preference, etc.), and other information.

In one embodiment, the Web server device 102 may leverage the player information provided by the player tracker server device in order to provide more personalized content. For example, the Web server device 102 may request information associated with the player currently engaging the gaming device 106. Based on the player information received from the player tracker server device, the Web server device 102 may generate a personalized Web page for the gaming device 106. Alternatively, rather than generate a personalized Web page, the Web server device 102 may choose from among available Web pages or Web content in order to deliver content that is likely to be desirable for the particular player. For example, the Web server device 102 might provide Web pages displaying advertisements that are likely to match interests of the player based on the player information.

In yet another embodiment, the gaming property server device 104 may comprise a reservations server device operable to accept any of a variety of reservations. The reservations server device may be associated with one or more hotels, one or more restaurants, one or more spas, one or more airlines, etc. In such an embodiment, the Web server device 102 may leverage the utility provided by the reservations server device in order to provide access to certain concierge-type services.

For example, a Web page provided by the Web server device 102 may list a variety of dining options. A player viewing these dining options may then interact with the Web page, requesting that a reservation be made at a particular restaurant at 7 PM. In response to this reservation request, the Web server device 102 may send its own reservation request to the reservations server device (e.g., via the S2S protocol), indicating a time at which the player would like a reservation. In one embodiment, the reservations server device may then place the reservation and send an affirmative reservation reply to the Web server device 102. Based on the affirmative reservation reply, the Web server device 102 may provide Web content to the gaming device 106, indicating that the player's desired reservations have been made.

In yet another embodiment, the gaming property server device 104 may comprise a sports book server device operable to accept wagers on sporting events. In such an embodiment, the Web server device 102 may leverage the utility provided by the sports book server device in order to allow a player at the gaming device 106 to place a bet on a sporting event without leaving the gaming device 106.

For example, the Web server device 102 may receive a message from the sports book server device indicating that a football game is about to begin (e.g., via the S2S protocol). In response to this message, the Web server device 102 may provide a Web page to the gaming device 106 displaying information about this football game and allowing a player to place a wager on the game. The player may then interact with the Web page, requesting that a wager be placed on the football game. In response to this wager request, the Web server device 102 may send a corresponding wager request to the sports book server device, indicating the wager that the player would like to make. In one embodiment, the sports book server device may then place the wager and send an affirmative wager reply to the Web server device 102. Based on the affirmative wager reply, the Web server device 102 may provide Web content to the gaming device 106, indicating that the player's desired wager has been placed.

The Web server device 102 and the gaming property server device 104 may take the form of software or firmware applications hosted and/or executed by processors on any of a variety of server computers. In one embodiment, the Web server device 102 and the gaming property server device 104 may be hosted on the same hardware, although, in other embodiments, the gaming property server device 104 may be hosted on a server computer that is kept more secure than the Web server device 102. One example server device computer that may be used to host either or both of the above server devices is described in greater detail below with reference to FIG. 9.

Description of Another Exemplary Gaming Property

Figure 2:
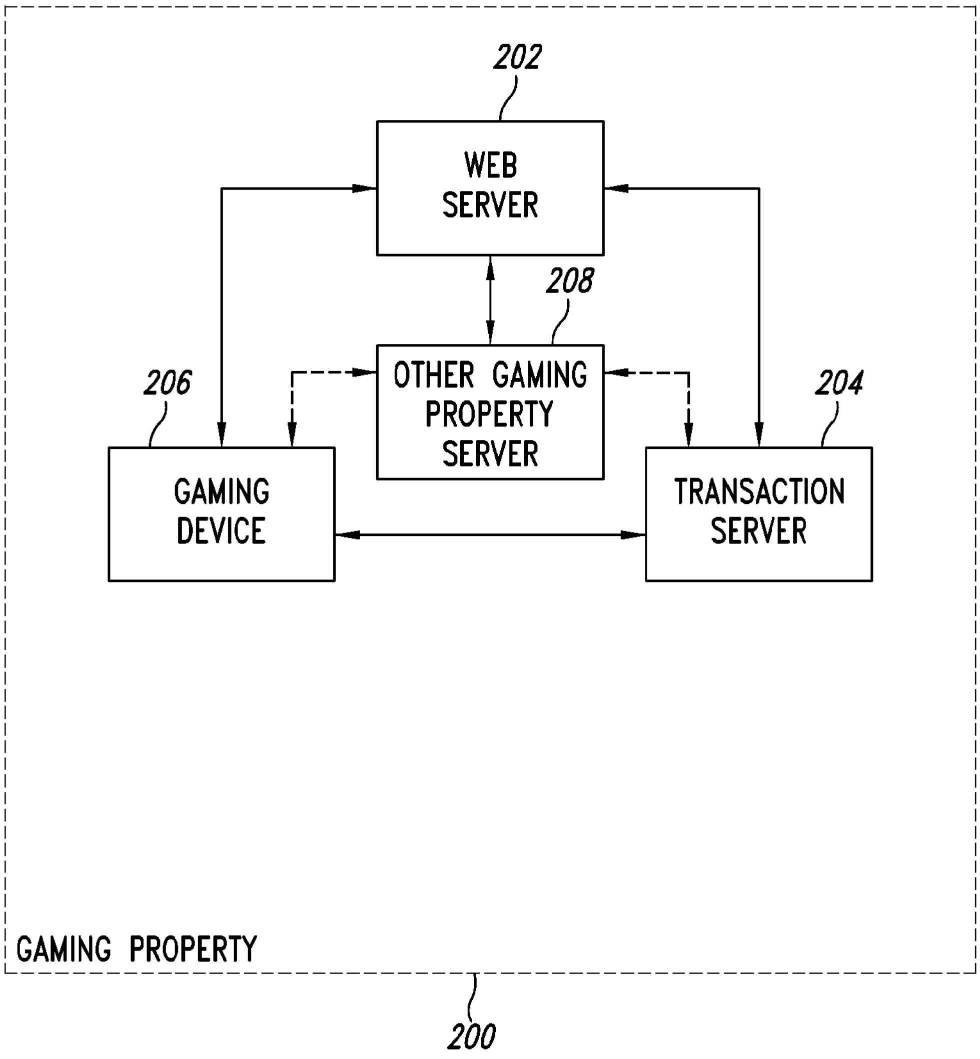
FIG. 2 is a schematic view of another gaming property including a Web server device, a transaction server device and another gaming property server device communicatively coupled to a gaming device, according to one illustrated embodiment.

FIG. 2 shows another gaming property 200 including a Web server device 202 and a transaction server device 204 communicatively coupled to each other, as well as to a gaming device 206. The server devices 202, 204 and the gaming device 206 may be configured substantially similarly to the corresponding server devices and devices described above with reference to the gaming property 100. In addition, the gaming property 200 may include an additional gaming property server device 208.

As described above, the gaming property server device 208 may provide access to one or more services associated with the gaming property 200. For example, the gaming property server device 208 may provide access to: player tracker services, reservations services, sports book services, secondary gaming services (for providing access to additional games, e.g., keno), informational services (for providing concierge-type information regarding hotels, dining, flights, etc.), etc. It may be understood that any networked services provided in the gaming property 200 may be provided by the gaming property server device 208.

As illustrated, the gaming property server device 208 may be communicatively coupled to the Web server device 202, the transaction server device 204 and/or the gaming device 206. Such communications may be carried out in accordance with a variety of protocols. In one embodiment, the gaming property server device 208 may be communicatively coupled to the Web server device 202 and the transaction server device 204 in accordance with the S2S protocol, and may be communicatively coupled to the gaming device 206 in accordance with the G2S protocol. In other embodiments, the gaming property server device 208 may not be communicatively coupled to one or more of the server devices 202, 204 or gaming device 206.

In one embodiment, the Web server device 202 may take advantage of the utility provided by the gaming property server device 208 in order to generate Web content for the gaming device 206. This Web content may also require transactions facilitated by the transaction server device 204. Thus, all three of these server devices 202, 204, 208 may orchestrate different operations and transactions transparently for a player in order to provide enhanced capabilities at the gaming device 206.

For example, the gaming property server device 208 may comprise a sports book server device operable to accept wagers on sporting events. As described above, the Web server device 202 may enable a player at the gaming device 206 to wager on a sporting event in coordination with this sports book server device. In one embodiment, if a player makes a wager request, the Web server device 202 may send a transaction request to the transaction server device 204 indicating an amount of the requested wager. The transaction server device 204 may then directly debit a player account at the gaming property 100 or may request that such funds be subtracted from the credit meter at the gaming device 206, as described above. When the transaction has been successfully completed, the Web server device 202 may then forward a wager request to the sports book server device in order to complete the player's wager. In another embodiment, the Web server device 202 may send a wager request to the sports book server device, and the sports book server device itself may send the transaction request to the transaction server device 204 before accepting the wager.

A number of similar transactions may be arranged between the Web server device 202, the transaction server device 204 and another gaming property server device 208, offering any of a variety of services.

Description of Another Exemplary Gaming Property

Figure 3:
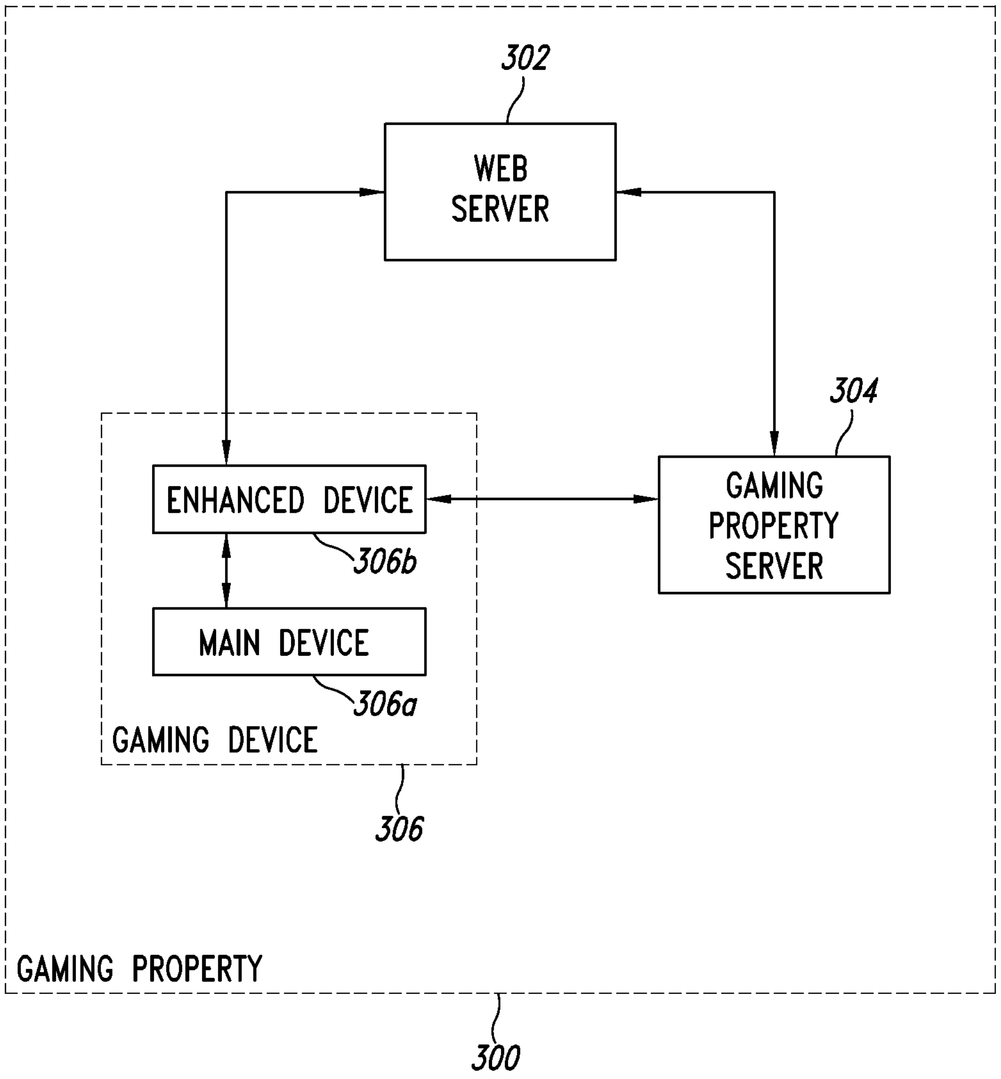
FIG. 3 is a schematic view of a gaming property including a Web server device and a gaming property server device communicatively coupled to a gaming device, wherein the gaming device comprises an enhanced computing device and a main device, and the enhanced computing device is communicatively coupled to the Web server device and the gaming property server device, according to one illustrated embodiment.

FIG. 3 shows yet another gaming property 300 including a Web server device 302 and a gaming property server device 304 communicatively coupled to each other, as well as to a gaming device 306. The server devices 302, 304 and the gaming device 306 may be configured substantially similarly to the corresponding server devices and devices described above with reference to the gaming property 100. However, as illustrated, the gaming device 306 may further comprise a main device 306*a* and an enhanced computing device 306*b*.

In one embodiment, the main device 306*a* comprises a computer device offering the primary games of chance and skill that a player may wager on. In some embodiments, the main device 306*a* may comprise a legacy device that is not configured to communicate with server devices via the G2S protocol. Thus, as illustrated in FIG. 3, the main device 306*a* may be directly communicatively coupled only to the enhanced computing device 306*b*, and not to the Web server device 302 or the gaming property server device 304. Of course, in other embodiments, the main device 306*a* may be capable of communicating with server devices via the G2S or other protocols.

The enhanced computer device 306*b* may comprise a computer device (e.g., microprocessor, memories or storage, buses) that is logically separate from the main device 306*a*, including a separate processing unit, memory, bus, etc. The enhanced computer device 306*b* may have relatively limited computational resources and may run an operating system having a relatively small footprint, such as Microsoft WINDOWS® CE. The enhanced computer device 306*b* may also include other hardware. In one embodiment, the enhanced computer device 306*b* may include a secondary graphics display separate from a main game display of the main device 306*a*, and this secondary graphics display may be configured to display Web pages received from the Web server device 302. In another embodiment, the enhanced computer device 306*b* may instead display the Web pages received from the Web server device 302 on the main game display of the main device 306*a*. The enhanced computer device 306*b* may further include a player club card reader configured to read a player club card issued by the gaming property 300.

As illustrated, the enhanced computer device 306*b* may be communicatively coupled with the Web server device 302, the gaming property server device 304 and the main device 306*a*. In one embodiment, the enhanced computer device 306*b* may be configured to communicate with the Web server device 302 via HTTPS and with the gaming property server device 304 via the G2S protocol. The enhanced computer device 306*b* may be further configured to communicate with the main device 306*a* in accordance with a Slot Accounting System (SAS) protocol. The SAS protocol is an older Gaming Standards Association standard serial protocol. In some embodiments, the main device 306*a* may comprise a legacy device that is only accessible via the SAS protocol, and the enhanced computer device 306*b* may facilitate communications with the gaming device 306 by acting as an intermediary between the main device 306*a* and the server devices 302, 304. Of course, in other embodiments, other communication protocols may be used.

In one embodiment, the main device 306*a* and the enhanced computer device 306*b* may exchange a variety of information via the SAS protocol. For example, the main device 306*a* may send information indicative of a number of games played, game outcomes, wagers made, monies won/lost, currency received at the main device 306*a*, currency dispensed at the main device 306*a*, etc. The enhanced computer device 306*b* may store this information locally, or may transmit some or all of this information to one or more server devices.

The enhanced computer device 306*b* may be further configured to conduct financial transactions in coordination with the main device 306*a*. For example, the enhanced computer device 306*b* may receive a transaction request from a transaction server device. In response, the enhanced computer device 306*b* may send a SAS-compliant request to the main device 306*a* indicative of a transaction amount to be transferred from a credit meter associated with the main device 306*a* to the enhanced computer device 306*b*. If this transaction with the main device 306*a* is successfully completed, the enhanced computer device 306*b* may send its own affirmative transaction reply to the transaction server device.

The main device 306*a* and the enhanced computer device 306*b* may have any of a variety of hardware configurations. One example configuration is discussed in greater detail with respect to FIGS. 7 and 8.

Description of Another Exemplary Gaming Property

Figure 4:
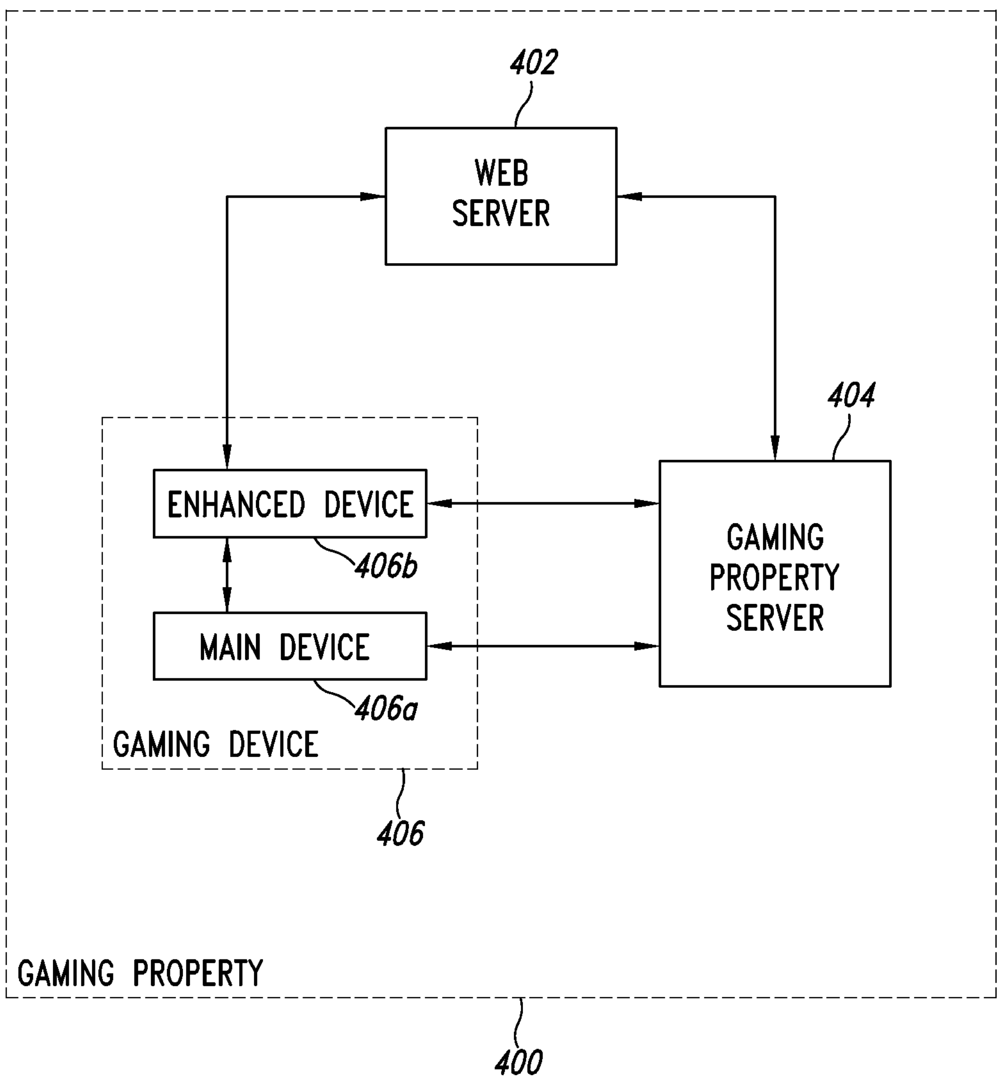
FIG. 4 is a schematic view of a gaming property including a Web server device and a gaming property server device communicatively coupled to a gaming device, wherein the gaming device comprises an enhanced computing device and a main device, and the enhanced computing device and the main device are communicatively coupled to the gaming property server device, according to another illustrated embodiment.

FIG. 4 shows another gaming property 400 including a Web server device 402, a gaming property server device 404 and a gaming device 406 comprising a main device 406*a* and an enhanced computer device 406*b*. The server devices 402, 404 and the gaming device 406 may be configured substantially similarly to the corresponding server devices and devices described above with reference to the gaming property 300. However, the main device 406*a* may also be directly communicatively coupled with the gaming property server device 404. In one embodiment, the main device 406*a* may be capable of communicating via the G2S protocol with the gaming property server device 404, although other protocols may be used.

In the illustrated configuration, the enhanced computer device 406*b* may be configured to display Web pages, and the main device 406*a* may be primarily responsible for conducting financial transactions. For example, the enhanced computer device 406*b* may maintain communications with the Web server device 402, while the main device 406*a* may orchestrate back end transactions with the gaming property server device 404.

As illustrated, the enhanced computer device 406*b* may communicate with the main device 406*a*, the Web server device 402 and the gaming property server device 404. However, in another embodiment, the enhanced computer device 406*b* may not be directly communicatively coupled with the main device 406*a*. In such an embodiment, the enhanced computer device 406*b* may receive Web pages from the Web server device 402, while the main device 406*a* carries out corresponding transactions, without the enhanced computer device 406*b* and the main device 406*a* communicating. In other embodiments, the roles of the enhanced computer device 406*b* and the main device 406*a* may be further divided, such that the enhanced computer device 406*b* is not directly communicatively coupled with the gaming property server device 404. Indeed, in some embodiments, the enhanced computer device 406*b* may communicate directly only with the Web server device 402.

Description of an Exemplary Gaming Device

Figure 5:
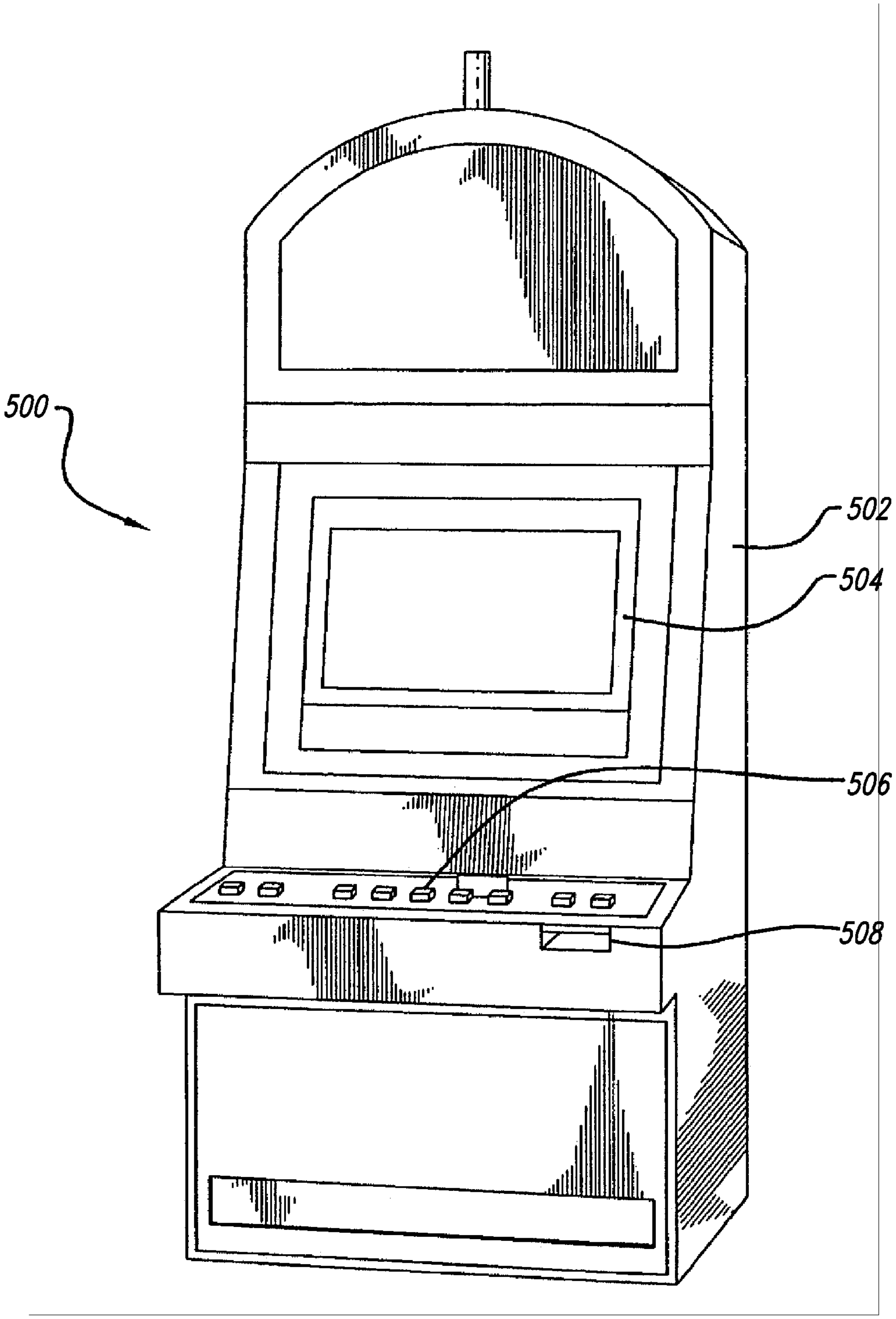
FIG. 5 is an isometric view of a gaming device configured to display an interactive Web page, according to one illustrated embodiment.

FIG. 5 shows a gaming device 500 configured to enable the display of interactive Web pages. In one embodiment, as described above, the Web pages may be delivered by one or more Web server devices located within a gaming property associated with the gaming device 500. However, in other embodiments, the Web pages may be provided by Web server devices outside the gaming property.

The gaming device 500 may comprise any of a variety of electronic devices offering primary games of chance, games of skill, or combinations thereof that a player may wager on. These primary games may include mechanical or video slots, video keno, video poker, video blackjack, Class II bingo, lottery, craps, a mechanical or video representation of a wheel game, etc. One example game of chance is BLAZING 7's, sold by Bally Technologies, Inc. In one embodiment, the gaming device 500 is a single-offering gaming device, enabling play of only one primary, locally stored game. However, in other embodiments, the gaming device 500 is relatively flexible, allowing a player to choose from among a number of locally stored games.

As illustrated, the exterior of the gaming device 500 may be defined by a housing 502. The housing 502 may be a self-standing unit that is generally rectangular in shape. In other embodiments, the housing may comprise a slant-top, bar-top, or table-top style cabinet. Of course, housings of various sizes and shapes may be used in different embodiments of the gaming device 500.

The gaming device 500 may further include a game display 504, operable to present the one or more primary games of chance or skill described above. In one embodiment, the game display 504 includes a CRT or a panel display, such as, but not limited to, liquid crystal, plasma, electroluminescent, vacuum fluorescent, field emission, or any other type of panel display. The game display 504 may also include a touch screen or touch glass system. Thus, the game display 504 may be configured to display a variety of information to a player engaging the gaming device 500 and simultaneously act as a user interface.

The gaming device 500 may further include a variety of other user interfaces via which a player may interact with the gaming device 500. For example, a plurality of player-activated buttons 506 may be provided on a shelf of the housing 502. The gaming device 500 may also include other user interfaces, such as a player club card reader, a radio frequency identification (RFID) reader, a fingerprint reader, a retinal scanner, etc.

The gaming device 500 may further include a voucher printer (not visible) that prints to and then dispenses vouchers via a voucher slot 508. The voucher printer may comprise any of a variety of printers configured to encode vouchers. Such vouchers may comprise confirmation receipts for players or may be redeemable for cash. Of course, in other embodiments, other mechanisms for paying out players may be provided, including a coin hopper, a bill dispenser, a device for electronic funds transfer, etc.

During operation, a player may purchase credits on the gaming device 500 in order to play a primary wagering game using any of a variety of payment options (e.g., bills, coins, credit cards, player accounts at a gaming property, etc.). Although not illustrated, the gaming device 500 may, for example, include a bill acceptor, a credit/debit card acceptor, a coin slot, etc. In another embodiment, the gaming device 500 may enable a player to transfer money from a player account to the gaming device 500. The gaming device 500 may enable access to the money in the player account based at least in part on biometric information, a unique number entered by the player, information read from an RFID transponder, information read from a player club card, etc.

For each game play (e.g., a virtual spin of a wheel game), the player may place a wager at the gaming device 500 corresponding to one or more bets having a certain bet denomination. Upon acceptance of the wager, the wagered amount may be subtracted from a credit meter of the gaming device 500. Depending upon the outcome of the game, the player may then win additional credits or may lose the amount of the wager.

In one embodiment, the game display 504 may be further configured to display one or more Web pages. As described above, the Web pages may be provided by one or more Web server devices and may be formatted for display by a Web browser running on the gaming device 500. In one embodiment, Web pages may be displayed on the game display 504 in a portion or window kept separate from a primary wagering game. In another embodiment, Web pages may be displayed using substantially the entire game display 504, such that the primary wagering game is no longer visible during interaction with a Web page.

A player may interact with the Web pages in a variety of ways. In one embodiment, the game display 504 may comprise a touch screen display, and the player may interact with the Web page by touching (or using other movements) to interact with the game display 504. In another embodiment, the player-activated buttons 506 may be used to interact with the Web pages. For example, options on a Web page may be substantially aligned with respective player-activated buttons 506, and the player may make selections by pressing the appropriate player-activated button 506.

Figure 6:
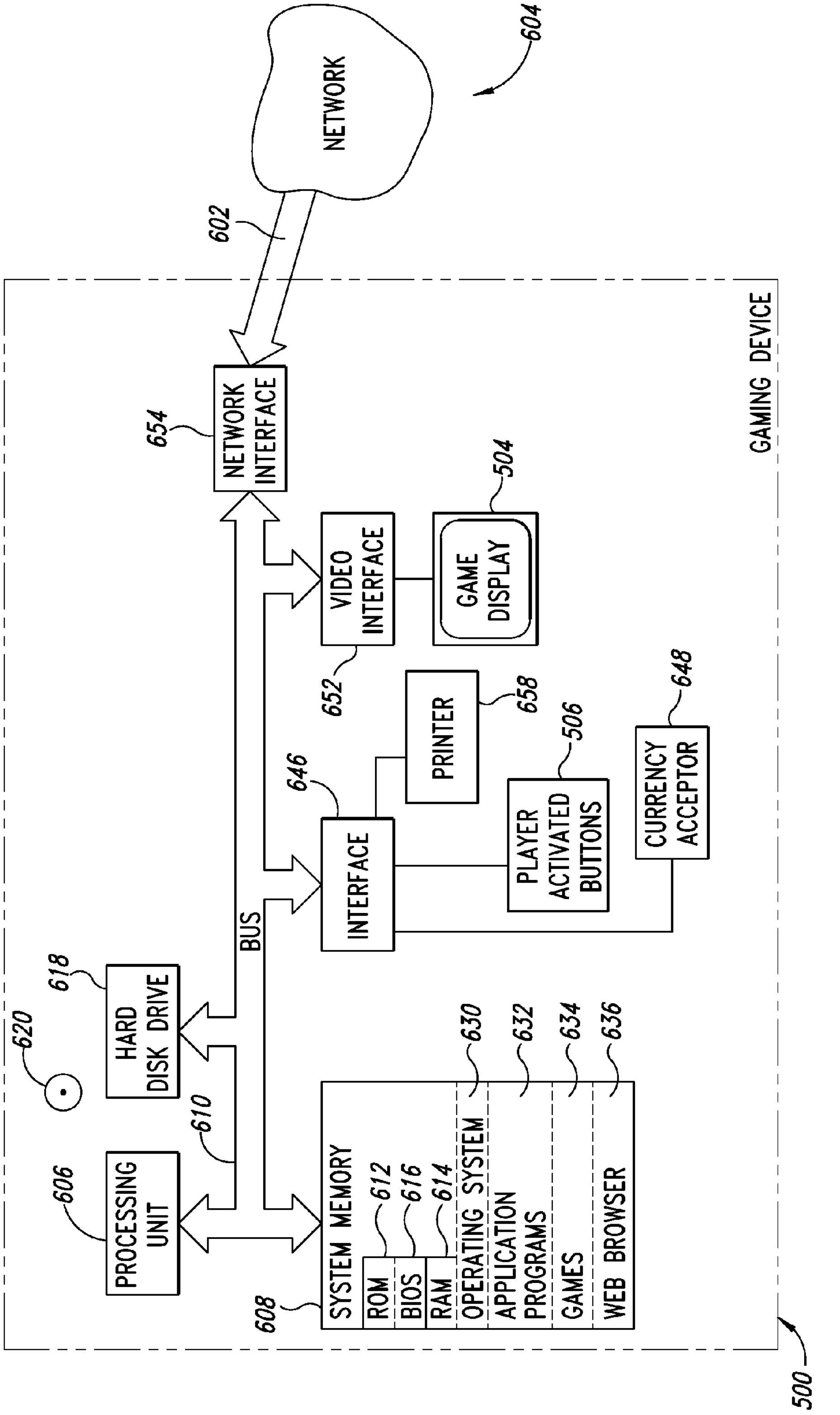
FIG. 6 is a schematic view of the gaming device of FIG. 5, according to one illustrated embodiment.

With reference to FIG. 6, the internal structure of the gaming device 500 may be described in greater detail. Although not required, the embodiments will be described in the general context of computer-executable instructions, such as program application modules, objects, or macros being executed by a computer. The embodiments can be practiced in distributed computing environments where tasks or modules are performed by remote processing devices, which are linked through a communications network. In a distributed computing environment, program modules may be located in both local and remote memory storage devices.

As illustrated in FIG. 6, the gaming device 500 may be coupled by at least one communication channel/logical connection 602 to a network 604. Thus, in one embodiment, the gaming device 500 may be communicatively coupled with other gaming devices and/or with one or more server devices (e.g., Web server devices) within a gaming property.

The gaming device 500 may have an internal configuration similar to that of a conventional PC, which includes a processing unit 606, a system memory 608 and a system bus 610 that couples various system components including the system memory 608 to the processing unit 606. The gaming device 500 will at times be referred to in the singular herein, but this is not intended to limit the embodiments to a single processor. Non-limiting examples of commercially available computing systems include, but are not limited to, an 80×86 or Core series microprocessor from Intel Corporation, U.S.A., a PowerPC microprocessor from IBM, a Sparc microprocessor from Sun Microsystems, Inc., or a PA-RISC series microprocessor from Hewlett-Packard Company.

The processing unit 606 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within the gaming device 500, such as during start-up.

The gaming device 500 may also include a hard disk drive 618 for reading from and writing to a hard disk 620. The hard disk drive 618 may communicate with the processing unit 606 via the system bus 610. The hard disk drive 618 may also include an interface or controller (not shown) coupled between it and the system bus 610, as is known by those skilled in the relevant art. The hard disk drive 618 provides nonvolatile storage for computer-readable instructions, data structures, program modules and other data for the gaming device 500. Although the depicted gaming device 500 employs a hard disk 620, those skilled in the relevant art will appreciate that other types of computer-readable media that can store data accessible by a computer may be employed, such as magnetic cassettes, flash memory cards, Bernoulli cartridges, RAMs, ROMs, smart cards, optical disks, magnetic disks, etc.

Program modules can be stored in the system memory 608, such as an operating system 630, one or more application programs 632, one or more primary games of chance 634, and a Web browser 636. The system memory 608 may also include communications programs permitting the gaming device 500 to access and exchange data over a network. For example, the system memory 608 may include programs configured to exchange messages with server devices in a gaming property in accordance with a standardized gaming protocol, such as the G2S protocol. The Web browser 636, as described above, may cause one or more Web pages to be displayed on the game display 504. In one embodiment, the Web browser 636 may be managed by one or more gaming property server devices as described in detail in co-pending U.S. patent application Ser. No. 11/938,746, filed on Nov. 12, 2007, titled "GAMING BROWSER MANAGER CLIENT SYSTEM AND METHOD," the contents of which application are hereby incorporated by reference in their entirety.

While shown in FIG. 6 as being stored in the system memory 608, the operating system 630, application programs 632, games 634 and Web browser 636 can be stored on the hard disk 620 of the hard disk drive 618.

A player can interact with the gaming device 500 through user interfaces such as the player-activated buttons 506. Other user interfaces for receiving user input can include a touch screen display, a touch-sensitive bezel, joystick, game pad, tablet, biometric scanners, etc. These and other user interfaces may be connected to the processing unit 606 through an interface 646 such as a universal serial bus ("USB") interface that couples to the system bus 610, although other interfaces such as a parallel port, a game port or a wireless interface or a serial port may be used.

The interface 646 may further be coupled to a currency acceptor 648 configured to accept currency from a player. In one embodiment, the currency acceptor 648 may include one or more coin slots, bill acceptors, etc. In another embodiment, the gaming device 500 may include a card slot for receiving a financial card issued by a financial institution (e.g., a credit/debit card), using which credits may be purchased.

The game display 504 and other display devices may be coupled to the system bus 610 via a video interface 652, such as a video adapter.

The gaming device 500 may operate in a networked environment using one or more logical connections 602 to communicate with one or more server devices and/or other gaming devices through the network 604. These logical connections may facilitate any known method of permitting computers to communicate, such as through one or more LANs and/or WANs, such as the Internet. Such networking environments are well known in wired and wireless enterprise-wide computer networks, intranets, extranets, and the Internet.

In one embodiment, the network interface 654 (communicatively linked to the system bus 610) may be used for establishing communications over the logical connection 602. In a networked environment, program modules, application programs, games, Web browsers, or portions thereof, can be stored outside of the gaming device 500 (not shown). Those skilled in the relevant art will recognize that the network connections shown in FIG. 6 are only some examples of ways of establishing communications between computing devices, and other connections may be used.

Description of another Exemplary Gaming Device

Figure 7:
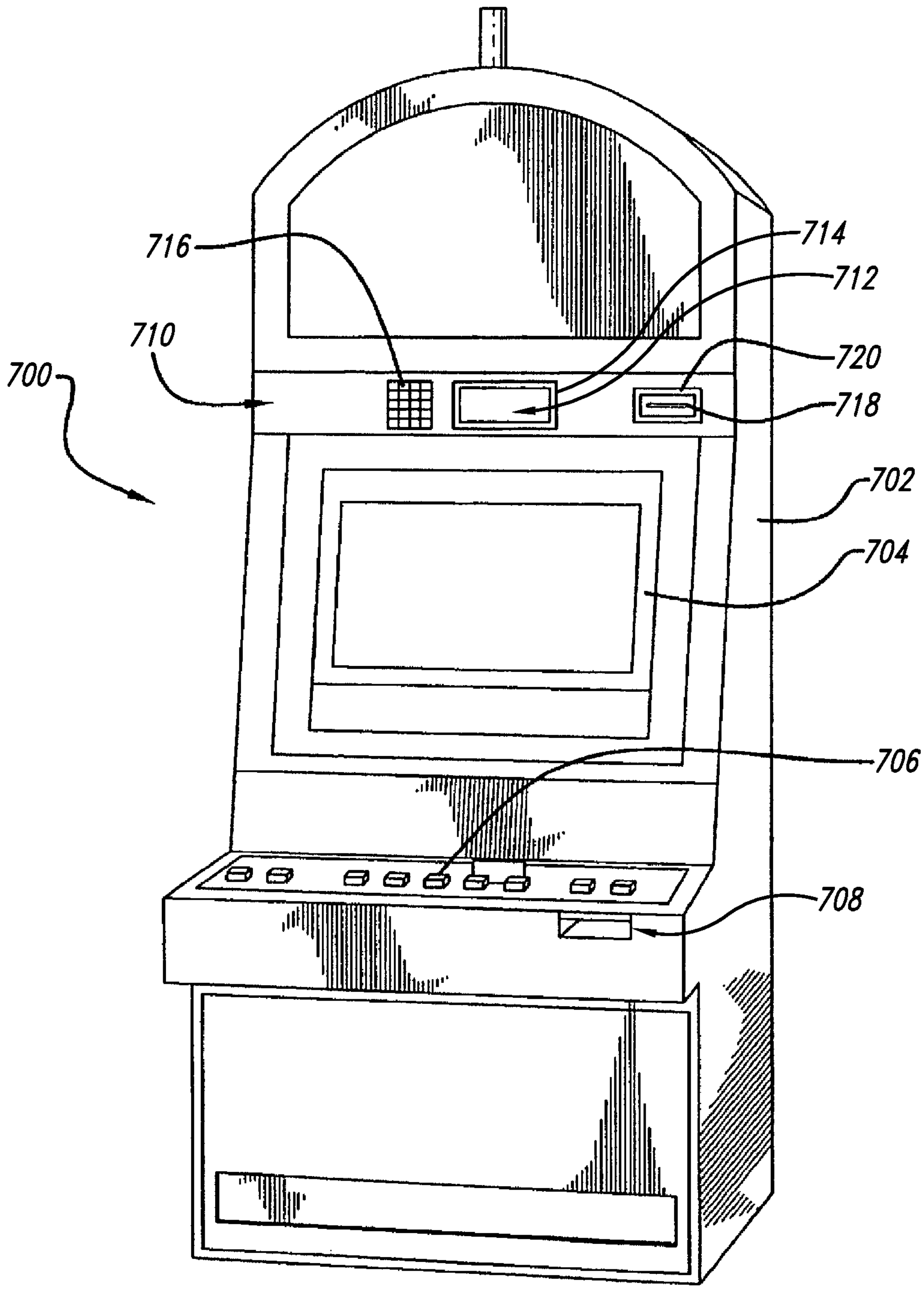
FIG. 7 is an isometric view of a gaming device including an enhanced computing device and a main device, the enhanced computing device being configured to display an interactive Web page, according to one illustrated embodiment.

FIG. 7 shows another gaming device 700 configured to enable the display of interactive Web pages. The gaming device 700 may be configured similarly to the gaming device 500 described above, except with regards to the addition of an enhanced computing device 710 described in greater detail below.

As illustrated, the gaming device 700 may include an enhanced computing device 710 near the top of the housing 702. As described above, this enhanced computing device 710 may appear integrated with the rest of the gaming device 700 but may comprise a logically separate computing device. In one embodiment, the enhanced computing device 710 may be configured to display one or more Web pages.

In the illustrated embodiment, the enhanced computing device 710 includes a secondary graphics display 712, a touch bezel 714, a keypad 716, a player club card reader 718, and a card reader bezel 720. The graphics display 712 may display a variety of information, including Web pages. In one embodiment, the main game display 704 of the gaming device 700 may display one or more primary games of chance, while the graphics display 712 presents Web content. Thus, a player at the gaming device 700 may interact with the Web pages even while a primary game is displayed on the game display 704.

The touch bezel 714 and the keypad 716 may comprise user interfaces via which a player may enter information into or otherwise interact with the gaming device 700, and more specifically with the enhanced computing device 710. Other user interfaces may, of course, also be provided, as described above with reference to the gaming device 500.

In one embodiment, the player club card reader 718 may be configured to read information indicative of a player identity from any of a variety of player club cards issued by a gaming property associated with the gaming device 700. The player club card reader 718 may also be configured to read gaming property employee cards, smart cards, and the like. Thus, the player club card reader 718 may enable a gaming property to monitor and track player and employee activity each time a player or employee inserts his or her card into the player club card reader 718. In one embodiment, the enhanced computing device 710 may send player identity information read via the player club card reader 718 to one or more server devices within a gaming property. This player information may in turn be used to personalize secondary game offerings, promotional offers, advertisements and other information presented in the Web pages displayed on the graphics display 712.

The enhanced computing device 710 may further include a network interface (not shown) via which the enhanced computing device 710 may communicate directly with one or more server devices in a network. For example, the enhanced computing device 710 may be configured to communicate with a gaming property server device via the G2S protocol, as described above.

Figure 8:
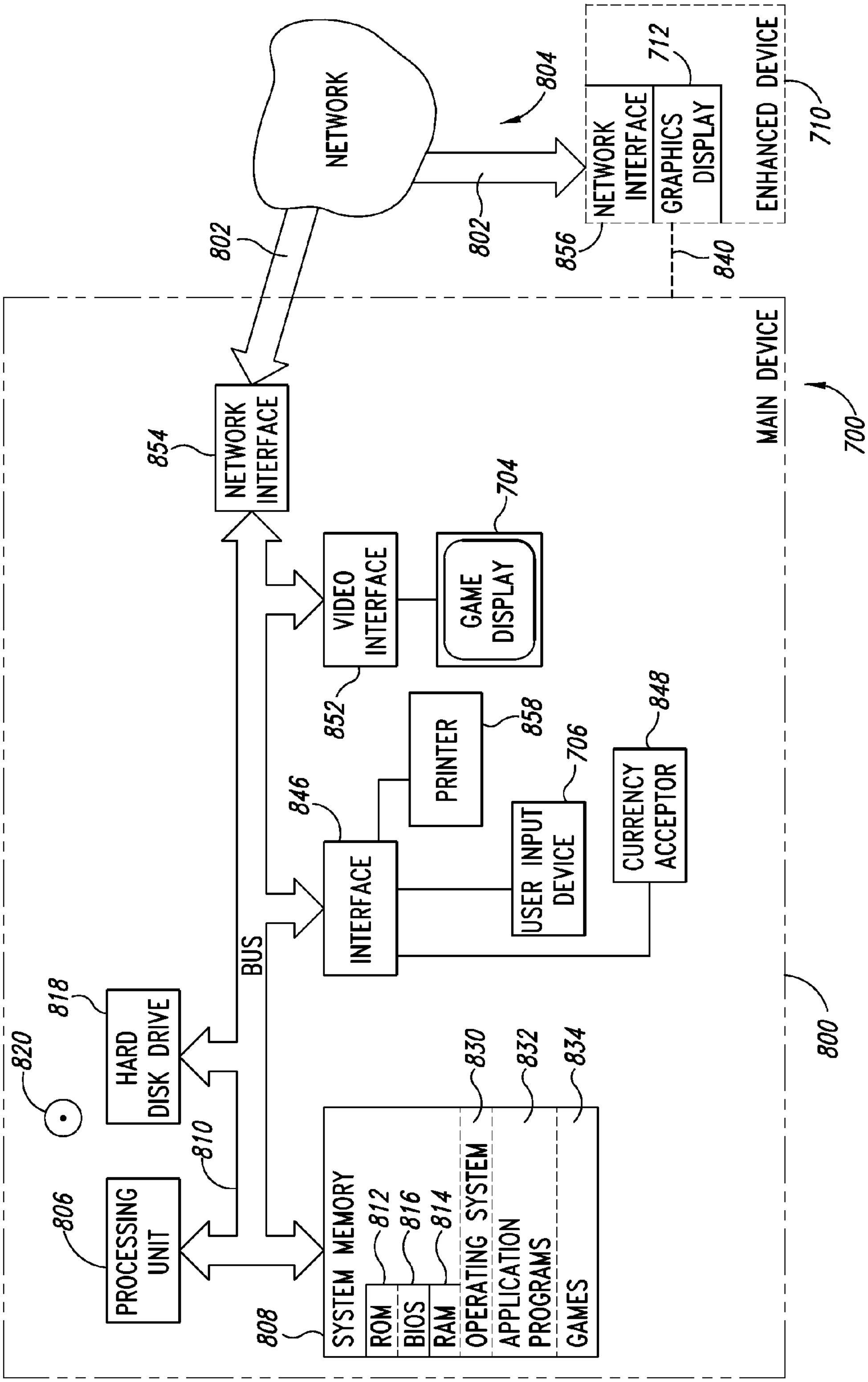
FIG. 8 is a schematic view of the gaming device of FIG. 7, according to one illustrated embodiment.

As shown in FIG. 8, the internal structure of the gaming device 700 is very similar to the internal structure of the gaming device 500, except with regards to the differences hereinafter discussed. In particular, the gaming device 700 may be seen to comprise two distinct, logical computing devices, the main device 800 (which is configured similarly to the gaming device 500) and the enhanced computing device 710 coupled thereto.

In one embodiment, the enhanced computing device 710 may be responsible for receiving and displaying Web pages received over the network 804. Thus, the system memory 808 of the main device 800 need not include a Web browser. Instead, a Web browser (not shown) may be executed by the enhanced computing device 710 in order to display the Web pages on the graphics display 712.

As illustrated, the enhanced computing device 710 may be communicatively coupled with the main device 800 via an interface 840. The interface 840 may comprise any of a variety of interfaces, and, in one embodiment, may comprise a serial interface operable to carry communications sent in accordance with the SAS protocol. In addition, the enhanced computing device 710 may include a network interface 856 configured to communicate via one or more logical connections 802 with the network 804. By this network interface 856, the enhanced computing device 710 may be able to receive Web pages from a Web server device and communicate via the G2S protocol with other gaming property server devices. Indeed, in one embodiment, the main device 800 of the gaming device 700 may lack the network interface 854 illustrated in FIG. 8, and only the enhanced computing device 710 may be communicatively coupled with the network 804.

In another embodiment, the enhanced computing device 710 may not appear integrated with the main device 800 and may lack an interface 840 directly coupling the enhanced computing device 710 to the main device 800. For example, a cell phone or another handheld device (e.g. a PDA) of a player may serve as the enhanced computing device 710 in one embodiment while the player interacts with the main device 800. In such an embodiment, the enhanced computing device 710 may be communicatively coupled to a Web server device via a wireless network interface 854 and may be configured to receive and display Web pages therefrom. Meanwhile, the main device 800 may facilitate back end transactions with other gaming property server devices via the network interface 854. In such an embodiment, the enhanced computing device 710 may still be considered a component of the gaming device 700 when operating in this mode, although the enhanced computing device 710 may also serve other functions (e.g., acting as a conventional cell phone).

Description of an Exemplary Server Computer

Figure 9:
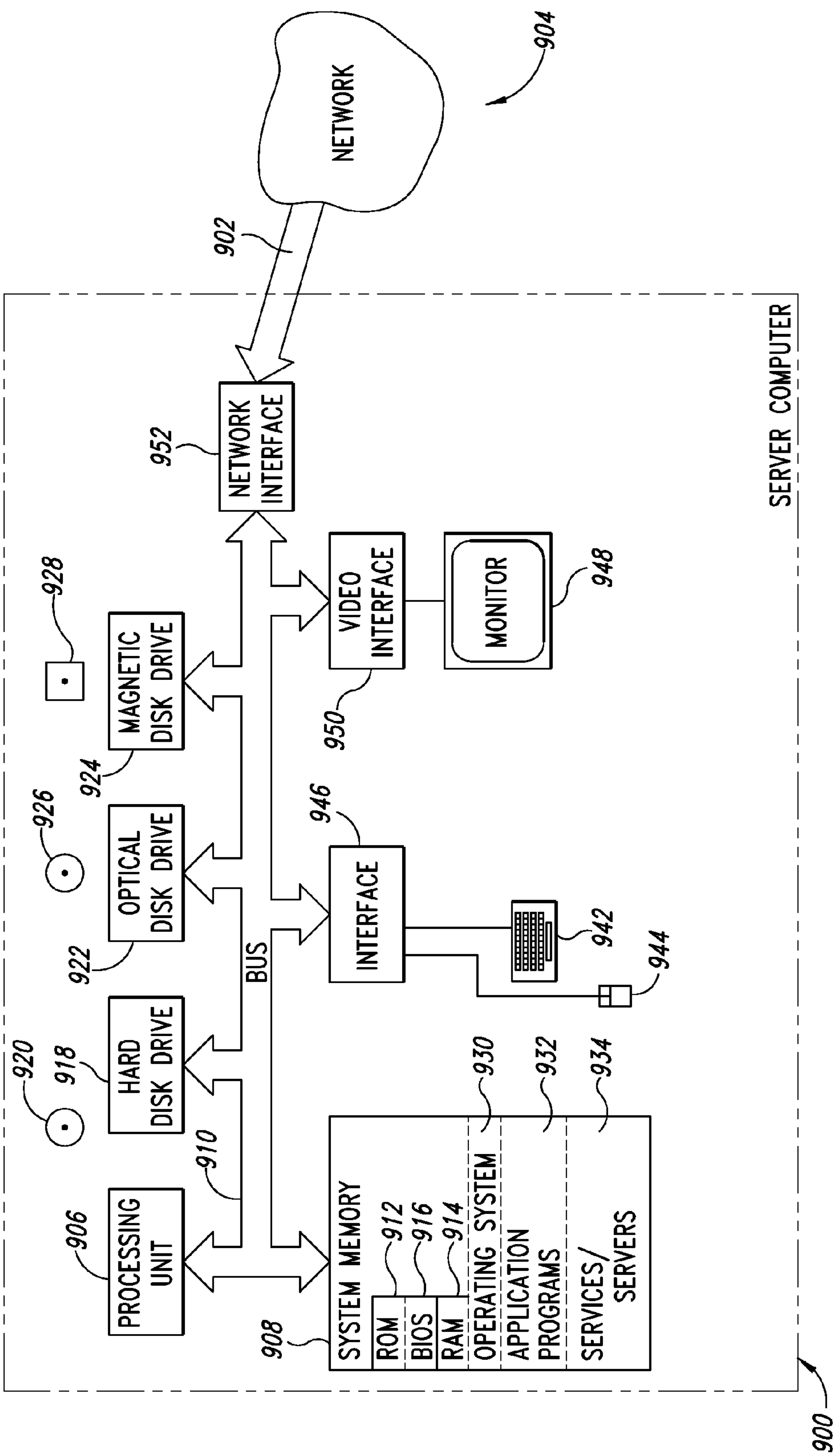
FIG. 9 is a schematic view of an exemplary server device computer, according to one illustrated embodiment.

FIG. 9 and the following discussion provide a brief, general description of a suitable server computer 900 for use in a gaming property. Such a server computer may be used to implement, for example, the Web server device 102, the gaming property server device 104, the transaction server device 204 and/or any other server devices described herein. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 9 shows the server computer 900 coupled by at least one communication channel/logical connection 902 to a network 904. This logical connection 902 may serve as any one of the logical connections illustrated in FIGS. 1-4 communicatively coupling server applications with gaming devices.

The server computer 900 may take the form of a conventional PC, which includes a processing unit 906, a system memory 908 and a system bus 910 that couples various system components including the system memory 908 to the processing unit 906. The server computer 900 will at times be referred to in the singular herein, but this is not intended to limit the embodiments to a single computing device, since in certain embodiments, there will be more than one server computer or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., or a PA-RISC series microprocessor from Hewlett-Packard Company.

The processing unit 906 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 9 are of conventional design. As a result, such blocks need not be described in further detail herein, as they will be understood by those skilled in the relevant art.

The system bus 910 can employ any known bus structures or architectures, including a memory bus with memory controller, a peripheral bus, and a local bus. The system memory 908 includes read-only memory ("ROM") 912 and random access memory ("RAM") 914. A basic input/output system ("BIOS") 916, which can form part of the ROM 912, may contain basic routines that help transfer information between elements within the server computer 900, such as during start-up.

The server computer 900 may also include a hard disk drive 918 for reading from and writing to a hard disk 920, and an optical disk drive 922 and a magnetic disk drive 924 for reading from and writing to removable optical disks 926 and magnetic disks 928, respectively. The optical disk 926 can be a CD or a DVD, while the magnetic disk 928 can be a magnetic floppy disk or diskette. The hard disk drive 918, optical disk drive 922 and magnetic disk drive 924 communicate with the processing unit 906 via the system bus 910. The hard disk drive 918, optical disk drive 922 and magnetic disk drive 924 may include interfaces or controllers (not shown) coupled between such drives and the system bus 910, as is known by those skilled in the relevant art. The drives 918, 922, 924, and their associated computer-readable media 920, 926, 928, provide nonvolatile storage of computer-readable instructions, data structures, program modules and other data for the server computer 900. Although the depicted server computer 900 employs hard disk 920, optical disk 926 and magnetic disk 928, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 908, such as an operating system 930, one or more application programs 932, and one or more services/servers 934. The system memory 908 may also include communications programs for permitting communications over a network. For example, the system memory 908 may include applications enabling communications via the G2S and S2S protocols. As described above, a number of services/servers 934 may be hosted on the server hardware displayed.

While shown in FIG. 9 as being stored in the system memory 908, the operating system 930, application programs 932, and the services/servers 934 can be stored on the hard disk 920 of the hard disk drive 918, the optical disk 926 of the optical disk drive 922 and/or the magnetic disk 928 of the magnetic disk drive 924.

A user can enter commands and information into the server computer 900 through input devices such as a touch screen or keyboard 942 and/or a pointing device such as a mouse 944. Other input devices can include a microphone, joystick, game pad, tablet, scanner, etc. These and other input devices may be connected to the processing unit 906 through an interface 946 such as a universal serial bus ("USB") interface that couples to the system bus 910, although other interfaces such as a parallel port, a game port or a wireless interface or a serial port may be used.

A monitor 948 and other display devices may be coupled to the system bus 910 via a video interface 950, such as a video adapter.

The server computer 900 operates in a networked environment using one or more logical connections 902 to communicate with one or more gaming devices, servers and/or other computing devices through the network 904. These logical connections may facilitate any known method of permitting computers to communicate, such as through one or more LANs and/or WANs, such as the Internet. Such networking environments are well known in wired and wireless enterprise-wide computer networks, intranets, extranets, and the Internet.

In one embodiment, a network interface 952 (communicatively linked to the system bus 910), may be used for establishing communications over the logical connection 902. In a networked environment, program modules, application programs, or portions thereof, can be stored outside of the server computer 900 (not shown). Those skilled in the relevant art will recognize that the network connections shown in FIG. 9 are only some examples of ways of establishing communications between computers, and other connections may be used.

Description of an Exemplary Method of Enabling Interaction with Web Pages

Figure 10:
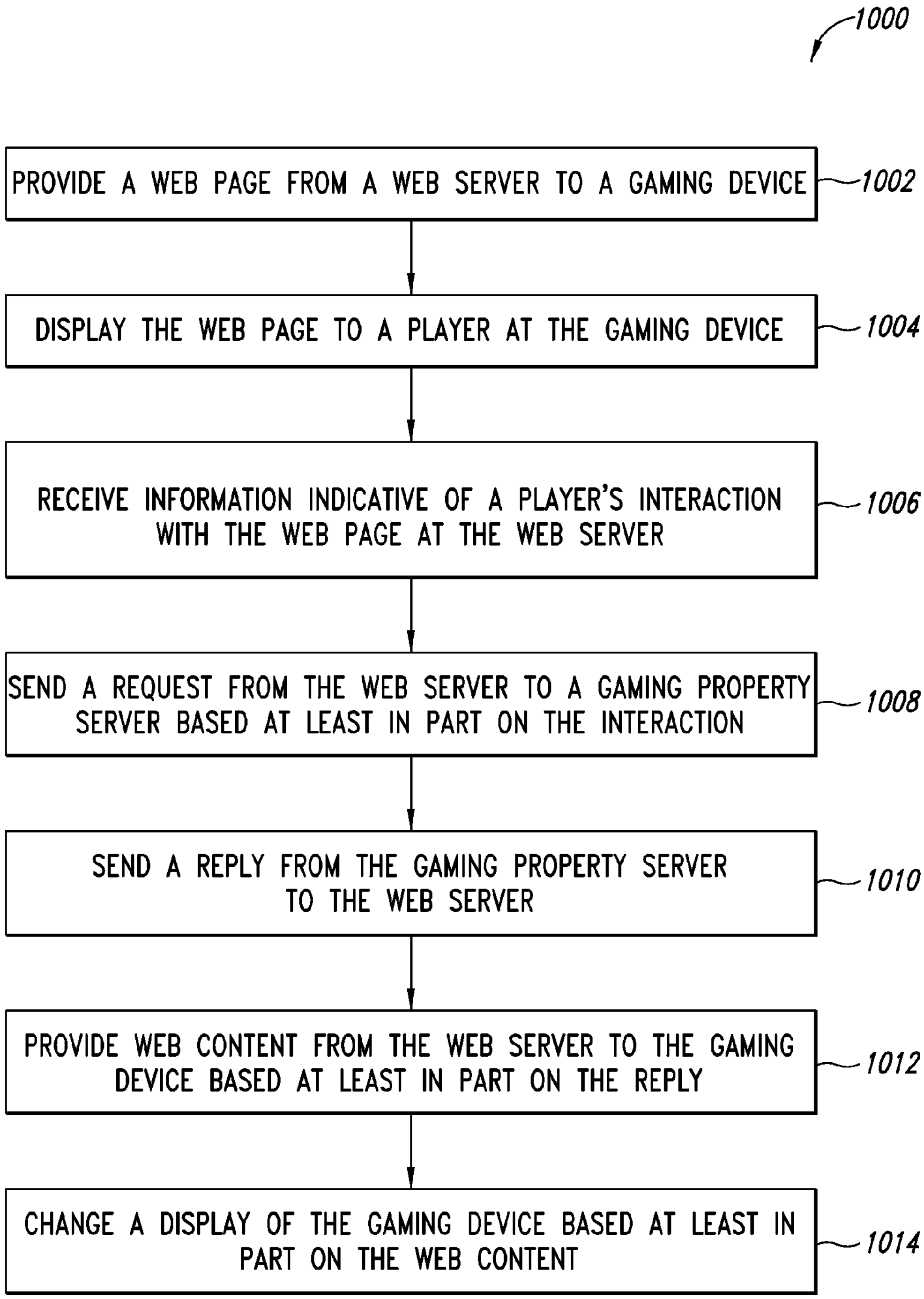
FIG. 10 is a flow diagram illustrating one method of enabling interaction with Web pages in a gaming property, according to one illustrated embodiment.

FIG. 10 illustrates a flow diagram for a method 1000 of enabling interaction with Web pages in a gaming property, according to one embodiment. This method 1000 will be discussed in the context of the gaming property 100 of FIG. 1. However, it may be understood that the acts disclosed herein may be executed in a variety of different gaming properties and may involve different gaming devices and server devices, in accordance with the described method.

The method begins at 1002, when a Web page is provided from a Web server device 102 to a gaming device 106. As described above, the Web page may comprise any document properly formatted for display by a Web browser on the gaming device 106. For example, the Web page may be formatted in HTML, XHTML, XML or another format, and the Web page may further include any of a variety of Web content, including audio, video or Web-based applications. The Web page may also present a variety of information. For example, the Web page may include secondary wagering games of skill or chance, entertainment games that do not accept wagers, promotional offers, advertisements, concierge-type services, transaction-related content, and more.

The Web page may be provided to the gaming device 106 in response to some action taken by a player at the gaming device 106. For example, in one embodiment, upon inserting a player club card into a player club card reader of the gaming device 106, the Web server device 102 may receive a message (either from the gaming device 106 or from a gaming property server device). In response to this message, the Web server device 102 may prepare and send a Web page to the gaming device 106. In another embodiment, the player may make a selection linking to the Web page, causing the gaming device 106 to send a request to the Web server device 102 for the Web page. In yet another embodiment, the player may insert a credit/debit card, causing the gaming device 106 to send yet another request to the Web server device 102 for the Web page. In other embodiments, a Web page may be provided to the gaming device 106 independently of a player's actions based on any of a variety of triggers. For example, certain advertisements may be provided as Web pages to the gaming device 106 at certain times based on a schedule agreed upon with the advertisers.

In one embodiment, before providing the Web page to the gaming device 106, the gaming device 106 may be authenticated. The Web page may then be provided to the gaming device 106 based at least in part on this authentication. The authentication may be carried out in a variety of ways well known to those skilled in the art. In one embodiment, the Web server device 102 may itself authenticate the gaming device 106, for example, by certificate exchange. As is well known in the art, the gaming device 106 may send a client electronic certificate to the Web server device 102, which includes a unique identifier of the gaming device 106 and an associated public key. The client electronic certificate may then be validated using a certificate from a trusted third party, such as the gaming property server device 104. In another embodiment, the gaming property server device 104 may authenticate the gaming device 106. In such an embodiment, the Web server device 102 may determine information indicative of the gaming device 106. This information may comprise a gaming device identifier accompanying an initial message sent by the gaming device 106, or another unique identifier, such as an internet protocol (IP) address of the gaming device 106. The Web server device 102 may then send this information on to the gaming property server device 104 communicatively coupled to the gaming device 106, and this information may be authenticated at the gaming property server device 104. For example, an IP address of the gaming device 106 may be determined by the Web server device 102 and may be authenticated against the known IP address of the gaming device 106 stored on a transaction server device.

At 1004, the Web page is displayed to a player at the gaming device 106. As described above, the gaming device 106 may include one or more Web browsers for enabling the display of the Web page. These Web browsers may comprise any of a variety of Web browsers, such as Internet Explorer by Microsoft or Firefox by Mozilla. These Web browsers may cause the gaming device 106 to display the Web page in a window of a main game display or in a secondary display.

At 1006, information indicative of a player's interaction with the Web page is received at the Web server device 102. In one embodiment, the Web page may include one or more elements with which the player may interact. Such elements may include selectable buttons, checkboxes, ActiveX controls, text boxes, interactive elements of a Web-based application, etc. As described above, the player can interact with the Web page using any of a variety of user interfaces of the gaming device 106, such as player-activated buttons, touch screens, etc.

Depending upon the content of the Web page, the player's interaction with the Web page may be related to any of a number of desired outcomes. In one embodiment, the player may be requesting that a wager be placed on a secondary wagering game or sporting event displayed on the Web page. In another embodiment, the player may be requesting that a reservation be made at a hotel or restaurant. In yet another embodiment, the player may be requesting that money be transferred from a credit/debit card to a credit meter of the gaming device 106. In still another embodiment, the player may be entering a search request corresponding to a concierge-type service. In another embodiment, the player may be accepting a promotional offer displayed on the Web page.

The gaming device 106 may then forward information indicative of the player's interaction with the Web page to the Web server device 102 via HTTPS. Of course, in other embodiments, other protocols may be used to communicate with the Web server device 102.

At 1008, a request is sent from the Web server device 102 to a gaming property server device 104 based at least in part on the interaction. In one embodiment, the request is sent from the Web server device 102 to the gaming property server device 104 in accordance with the S2S protocol, although other protocols may also be used.

In one embodiment, the gaming property server device 104 may comprise a transaction server device, and the request may comprise a transaction request. In another embodiment, the gaming property server device 104 may comprise a player tracker server device, and the request may comprise a request for player information. In yet another embodiment, the gaming property server device 104 may comprise a reservations server device, and the request may comprise a reservation request for completing a reservation. In yet another embodiment, the gaming property server device 104 may comprise a sports book server device, and the request may comprise a request to place a wager.

At 1010, a reply is sent from the gaming property server device 104 to the Web server device 102. In one embodiment, this reply is sent in accordance with S2S protocol and may comprise any of a variety of affirmative or negative replies responsive to the request. In one embodiment, the gaming property server device 104 may also carry out back end searches or transactions and may communicate with one or more additional server devices or the gaming device 106 in order to generate the reply.

At 1012, the Web server device 102 provides Web content to the gaming device 106 based at least in part on the reply. As described above, this Web content may comprise any of a variety of information that is received by the Web browser at the gaming device 106. For example, in one embodiment, the Web content may comprise a second Web page configured for display at the gaming device 106. In another embodiment, the Web content may comprise information received by a Web-based application.

At 1014, a display of the gaming device 106 is changed based at least in part on the Web content. For example, if a player attempted to place a wager on a secondary wagering game comprising a Web-based application, and the Web server device 102 provided Web content indicative of a successful wager back to the Web-based application, the secondary wagering game may then be displayed in a state that enables play. In other embodiments, of course, a variety of other Web content may change the display of the gaming device 106.

Turning to more specific examples in greater detail, the Web page provided by the Web server device 102 may include a secondary wagering game, and the gaming property server device 104 may comprise a transaction server device. A player at the gaming device 106 may interact with the Web page, requesting to place a wager on the secondary wagering game. The Web server device 102 may then receive the wager request, and may send a transaction request to the transaction server device (e.g., via the S2S protocol) indicating an amount of the requested wager. In one embodiment, the transaction server device may directly debit a player account at the gaming property 100. Alternatively, the transaction server device may direct its own credit transaction request to the gaming device 106 (e.g., via the G2S protocol), requesting that the gaming device 106 subtract the amount of the wager from a credit meter of the gaming device 106. If the credit meter includes sufficient credits, the gaming device 106 may then subtract the amount of the wager. In the event that the amount of the wager exceeds the credits already purchased, a corresponding notification may be sent from the gaming device 106 back to the transaction server device, and, in turn, back to the Web server device 102. The Web server device 102 may then send Web content to the gaming device 106 indicating that the player must insert more money in order to enable placement of the wager. The gaming device 106 may eventually send a transaction reply to the transaction server device indicative of successful subtraction of the amount of the wager. The transaction server device may then send an affirmative transaction reply to the Web server device 102. Based on the affirmative transaction reply, the Web server device 102 may provide Web content to the gaming device 106 that causes the secondary wagering game to enter a state that enables game play.

In another example, the Web page provided by the Web server device 102 may include information indicative of dining choices or of hotel choices associated with the gaming property 100. The gaming property server device 104 may comprise a reservations server device configured to accept reservations relating to these dining or hotel choices. A player viewing these choices may interact with the Web page, requesting that a particular reservation be made. The Web server device 102 may receive this reservation request, and may send its own reservation request to the reservations server device (e.g., via the S2S protocol). In one embodiment, the reservations server device may then place the reservation and send an affirmative reservation reply to the Web server device 102. Based on the affirmative reservation reply, the Web server device 102 may provide Web content to the gaming device 106, indicating that the player's desired reservations have been made. In some embodiments, the player may then be able to print out a reservation confirmation via a voucher printer associated with the gaming device 106.

In yet another example, the Web page provided by the Web server device 102 may include information indicative of dining choices or of hotel choices associated with the gaming property 100. However, the Web server device 102 may only be coupled to a transaction server device. In such an embodiment, the Web server device 102 may send a reservation request to the transaction server device (e.g., via the S2S protocol), and the transaction server device may forward its own reservation request on to a reservations server device. The chain of reservation replies may then come back to the Web server device 102, and the Web server device 102 may provide Web content to the gaming device 106, indicating that the player's desired reservations have been made. In either embodiment, these back end transactions may be made substantially transparent to the player.

In still another example, the Web page provided by the Web server device 102 may include an offer to transfer money from a credit/debit card of the player to the gaming device 106 (or to a player account at the gaming property 100), and the gaming property server device 104 may comprise a transaction server device. A player at the gaming device 106 may insert a credit/debit card and may interact with the Web page, requesting that a certain amount of money be transferred from the credit/debit card to the gaming device 106. In other embodiments, the player may request that money be transferred from any of a variety of external, third party financial accounts to the gaming device 106 or to player accounts at the gaming property 100. In one embodiment, the Web page may also facilitate the use of identification verification technologies. For example, the Web page may further request that the player enter a personal identification number (PIN), some biometric identification (e.g., a retinal scan or fingerprints), or other identifying information. The Web server device 102 may receive the transfer request from the gaming device 106 (in addition to the identification verification information) and may send a corresponding transfer request to the transaction server device (e.g., via the S2S protocol). The transfer request sent to the transaction server device may include, inter alia, information indicative of the credit/debit card, a player identifier, as well as the identification verification information. In one embodiment, the transaction server device may then communicate (directly or indirectly) with third party server device(s) in order to initiate the transfer from the credit/debit card (or other third party financial account). Upon receiving a transaction confirmation from the third party server device(s), the transaction server device may send a credit transaction request to the gaming device 106 (e.g., via the G2S protocol), requesting that the gaming device 106 add the transfer amount to a credit meter of the gaming device 106. The gaming device 106 may then add the transfer amount to the credit meter and send a transaction reply to the transaction server device indicative of successful addition of the transfer amount. The transaction server device may then send an affirmative transfer reply to the Web server device 102. Based on the affirmative transfer reply, the Web server device 102 may provide Web content to the gaming device 106 indicative of the successful transfer.

Description of an Exemplary Method for Enabling Personalization of Web Pages

Figure 11:
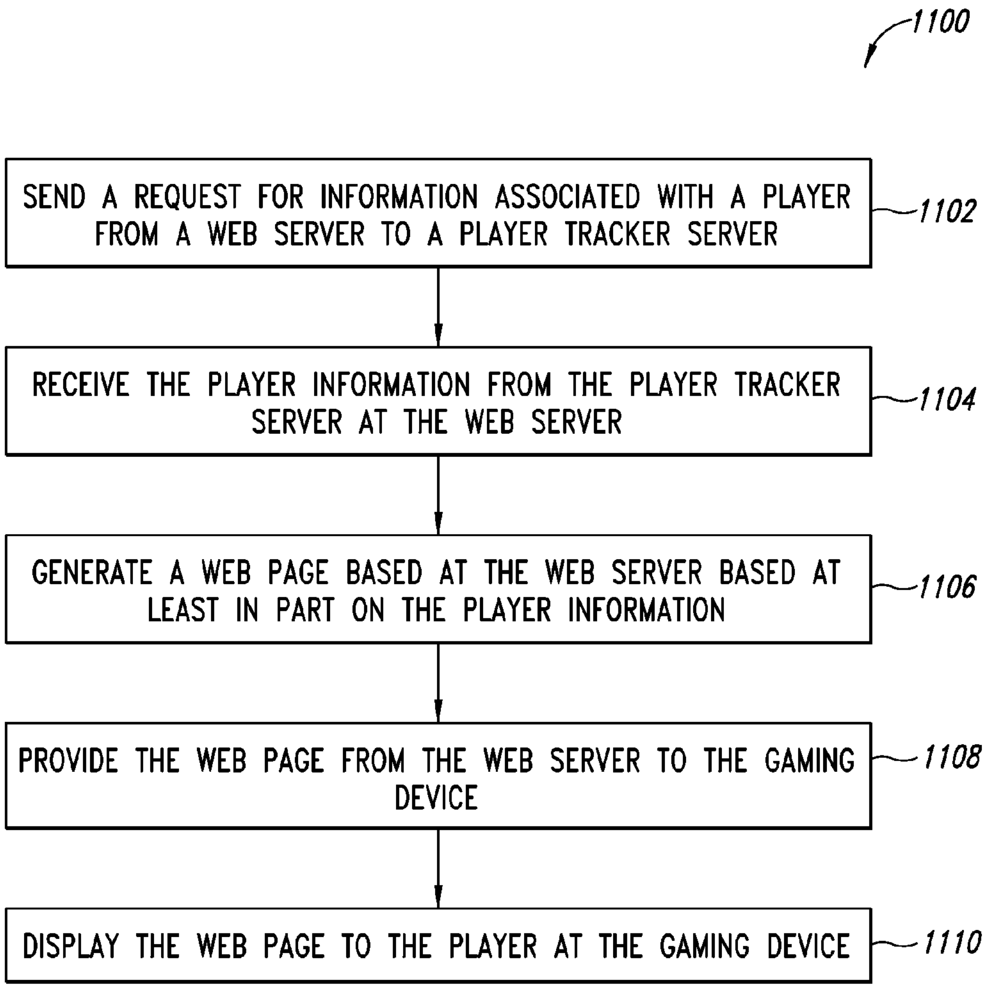
FIG. 11 is a flow diagram illustrating one method of enabling personalization of Web pages in a gaming property, according to one illustrated embodiment.

FIG. 11 illustrates a flow diagram for a method 1100 of enabling the personalization of Web pages in a gaming property, according to one embodiment. This method 1100 will be discussed in the context of the gaming property 100 of FIG. 1. However, it may be understood that the acts disclosed herein may be executed in a variety of different gaming properties and may involve different gaming devices and server devices, in accordance with the described method.

The method begins at 1102, when a request for information associated with a player is sent from a Web server device 102 to a player tracker server device. In one embodiment, as described above, the player tracker server device may store a variety of information concerning players at the gaming property 100. The player information requested by the Web server device 102 may include: player session information (information indicative of the wagers that have been placed by a player, the jackpots that have been won, the amount of time that the player has been playing, etc.), biographical information (name, birthday, address, phone number, marital status, etc.), player status information (VIP status at the gaming property 100, frequency of visits to the gaming property 100, amounts wagered at the gaming property 100, promotional awards for which the player is eligible, etc.), gaming device preference information (language preference, sound preference, font preference, brightness preference, etc.), or other player information.

In one embodiment, the Web server device 102 may first receive information from the gaming device 106 indicative of the particular gaming device 106 that has requested a Web page from the Web server device 102. For example, in one embodiment, in an original Web page request sent by the gaming device 106, the gaming device 106 may transmit a gaming device identifier (e.g., a unique numerical identifier defined by the gaming property 100) to the Web server device 102. The Web server device 102 may then send this gaming device identifier to a gaming property server device 104 (e.g., a transaction server device), and may receive a response including information indicative of the gaming device 106 as well as information indicative of the player currently engaging the gaming device 106. The Web server device 102 may then send a request for player information to the player tracker server device based on this player identity information.

In another embodiment, the original Web page request sent by the gaming device 106 may not include a gaming device identifier. Instead, the Web server device 102 may uniquely identify the gaming device 106 based upon an IP address associated with the gaming device 106, which may be determined based upon the original Web page request. The Web server device 102 may then send the IP address to a gaming property server device 104 (e.g., a transaction server device), and may receive a response including information indicative of the gaming device 106 as well as information indicative of the player currently engaging the gaming device 106. The Web server device 102 may then send a request for player information to the player tracker server device based on this player identity information.

In yet another embodiment, the Web server device 102 may receive information from the gaming device 106 itself indicative of the player currently engaging the gaming device 106. For example, when a player inserts a player club card into a player club card reader, information indicative of the player's identity may be read by the gaming device 106, and may be subsequently forwarded to the Web server device 102. The Web server device 102 may then send the request for player information to the player tracker server device based on this player identity information.

At act 1104, the player information is received from the player tracker server device at the Web server device 102, and at act 1106, a Web page is generated at the Web server device based at least in part on the player information. In one embodiment, the Web page may include content corresponding directly to the player information. For example, the personalized Web page may include a greeting including the player's name, a "Happy Birthday" message, or a congratulatory message related to a recent jackpot won by the player. In another embodiment, the Web page generated by the Web server device may be selected from among available Web pages or Web content in order to deliver content that is likely to be desirable for the player based on the player information. For example, if the player is in a certain age demographic, particular advertisements may be selected for display on the Web page.

At act 1108, the Web page is provided from the Web server device 102 to the gaming device 106, and at act 1110, the Web page is displayed to the player at the gaming device 106. Much of the above description pertaining to acts 1002 and 1004 may be applied equally to acts 1108 and 1110 as well.

Description of an Exemplary Method for Enabling Interaction with Web Pages

Figure 12:
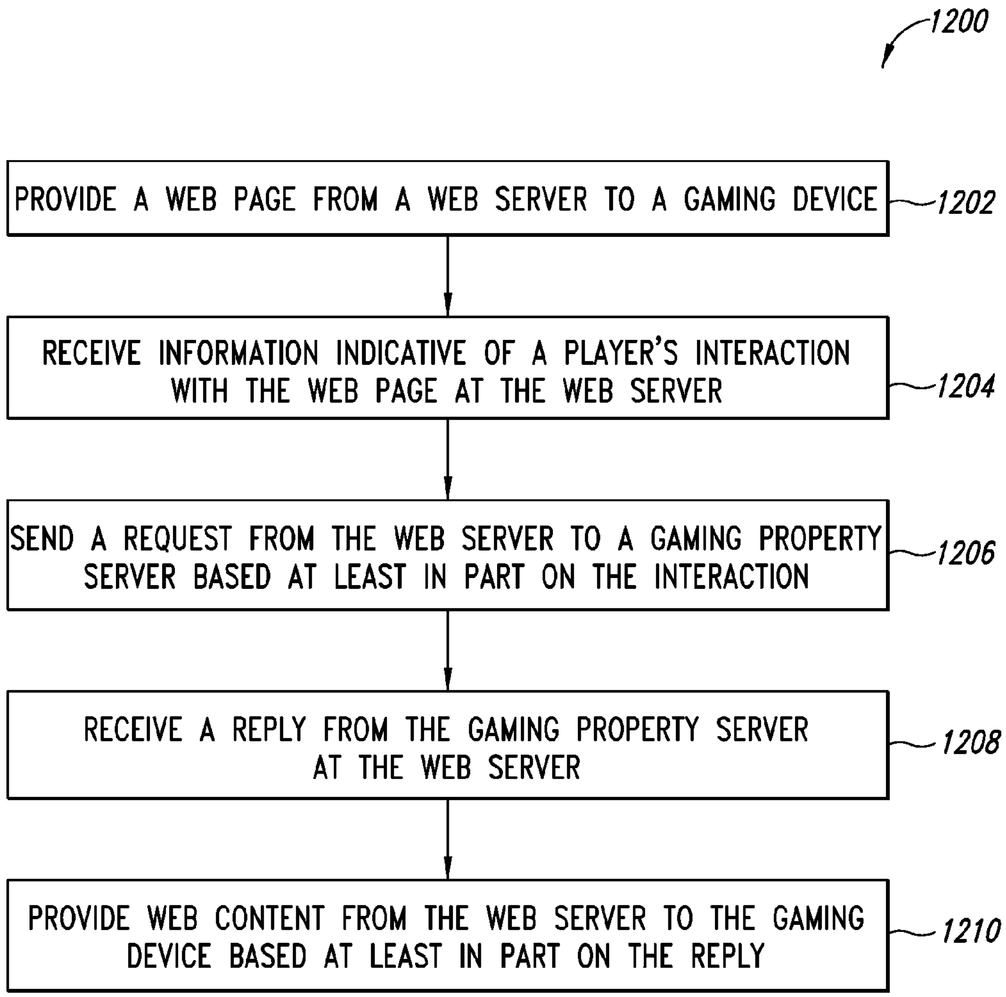
FIG. 12 is a flow diagram illustrating another method of enabling interaction with Web pages in a gaming property, according to one illustrated embodiment.

FIG. 12 illustrates a flow diagram for a method 1200 of enabling interaction with Web pages in a gaming property, according to one embodiment. This method 1200 will be discussed in the context of the gaming property 100 of FIG. 1. However, it may be understood that the acts disclosed herein may be executed in a variety of different gaming properties and may involve different gaming devices and server devices, in accordance with the described method.

The method begins at 1202, when a Web page is provided from a Web server device 102 to a gaming device 106. At act 1204, the Web server device 102 receives information indicative of a player's interaction with the Web page. At act 1206, a request is sent from the Web server device to a gaming property server device 104 based at least in part on the interaction. At act 1208, a reply is received from the other gaming property server device 104 at the Web server device 102. At act 1210, Web content is provided from the Web server device 102 to the gaming device 106 based at least in part on the reply. Much of the above description pertaining to acts 1002, 1006, 1008, 1010 and 1012 may be applied equally to acts 1202, 1204, 1206, 1208 and 1210, respectively. However, in one embodiment, it may be understood that all of the acts of the method 1200 may be accomplished by the Web server device 102.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any processor-related system or method. In the context of this document, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a nonexhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), and a portable compact disc read-only memory (CDROM). Note that the computer-readable medium could even be paper or another suitable medium upon which the program associated with logic and/or information is printed or hole punched, as the program can be electronically captured, via for instance optical scanning of the paper or other medium, then compiled, interpreted or otherwise processed in a suitable manner if necessary, and then stored in memory.

The teachings of U.S. Provisional Patent Application Ser. No. 61/057,306, filed May 30, 2008 are incorporated by reference herein in its entirety.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device by a processor;

responsive to the successful authentication of the respective gaming device, generating a Web page at a Web server device;

causing the display of the Web by initiating on the at least one display an instance of a Web browser to display data representative of the Web page while providing the primary game to the player;

receiving information indicative of a player's interaction with the Web page at the Web server device;

sending a transaction request from the Web server device to a transaction server device based at least in part on the interaction;

receiving a transaction reply from the transaction server device at the Web server device; and providing Web content from the Web server device to the Web browser based at least in part on the transaction reply, wherein authenticating the respective gaming device includes receiving an electronic certificate from the respective gaming device at the Web server device, and validating the electronic certificate at the Web server device by the at least one processor.

2. The method of claim 1 wherein causing the display of the Web page includes causing the display of a secondary game configured to accept a wager.

3. The method of claim 2 wherein receiving the information indicative of the player's interaction with the Web page includes receiving a wager request to make the wager on the secondary game.

4. The method of claim 1 wherein providing the Web content comprises providing a second Web page.

5. The method of claim 1 wherein providing the Web page includes providing a Web-based application, and providing the Web content includes providing the Web content to the Web-based application.

6. The method of claim 1 wherein communications between the respective gaming device and the Web server device conform to HTTPS and communications between the Web server device and the transaction server device conform to S2S protocol.

7. The method of claim 1, further comprising:

sending a request for information associated with the player from the Web server device to a player tracker server device;

receiving the player information from the player tracker server device at the Web server device;

generating a second Web page at the Web server device based at least in part on the player information; and causing the display of data representative of the second Web page via the Web browser on the at least one display.

8. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device by a processor;

responsive to the successful authentication of the respective gaming device, generating a Web page at a Web server device;

causing the display of the Web by initiating on the at least one display an instance of a Web browser to display data representative of the Web page while providing the primary game to the player;

receiving information indicative of a player's interaction with the Web page at the Web server device;

sending a transaction request from the Web server device to a transaction server device based at least in part on the interaction;

receiving a transaction reply from the transaction server device at the Web server device; and providing Web content from the Web server device to the Web browser based at least in part on the transaction reply, wherein authenticating the gaming device includes:

determining information indicative of the respective gaming device at the Web server device;

sending the information indicative of the respective gaming device from the Web server device to the transaction server device; and receiving an authentication indication from the transaction server device at the Web server device.

9. The method of claim 8, wherein determining the information indicative of the respective gaming device comprises determining an IP address of the respective gaming device.

10. The method of claim 8 wherein causing the display of the Web page includes causing the display of a secondary game configured to accept a wager.

11. The method of claim 10 wherein receiving the information indicative of the player's interaction with the Web page includes receiving a wager request to make the wager on the secondary game.

12. The method of claim 8 wherein providing the Web page includes providing a Web-based application, and providing the Web content includes providing the Web content to the Web-based application.

13. The method of claim 8 wherein communications between the respective gaming device and the Web server device conform to HTTPS and communications between the Web server device and the transaction server device conform to S2S protocol.

14. The method of claim 8, further comprising:

sending a request for information associated with the player from the Web server device to a player tracker server device;

receiving the player information from the player tracker server device at the Web server device;

generating a second Web page at the Web server device based at least in part on the player information; and causing the display of data representative of the second Web page via the Web browser on the at least one display.

15. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device by a processor;

responsive to the successful authentication of the respective gaming device, generating a Web page at a Web server device;

causing the display of the Web by initiating on the at least one display an instance of a Web browser to display data representative of the Web page while providing the primary game to the player;

receiving information indicative of a player's interaction with the Web page at the Web server device;

sending a transaction request from the Web server device to a transaction server device based at least in part on the interaction;

receiving a transaction reply from the transaction server device at the Web server device;

providing Web content from the Web server device to the Web browser based at least in part on the transaction reply;

providing a second Web page from the Web server device to the respective gaming device;

receiving information indicative of a player's second interaction associated with the second Web page at the Web server device;

sending a reservation request from the Web server device to a reservations server device based at least in part on the second interaction;

receiving a reservation reply from the reservations server device at the Web server device; and causing the display of data representative of the second Web page based at least in part on the reservation reply via the Web browser on the at least one display.

16. The method of claim 15 wherein providing the second Web page includes providing information indicative of at least one of a number of dining choices or a number of hotel choices associated with the gaming property.

17. The method of claim 16 wherein receiving the information indicative of the player's second interaction includes receiving a request to make a hotel reservation.

18. The method of claim 15 wherein causing the display of the Web page includes causing the display of a secondary game configured to accept a wager.

19. The method of claim 18 wherein receiving the information indicative of the player's interaction with the Web page includes receiving a wager request to make the wager on the secondary game.

20. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device via at least one microprocessor;

responsive to successful authentication of the respective gaming device, generating a Web page at a Web server device;

causing the display of the Web page by initiating on the at least one display an instance of a Web browser to display data representative of the Web page while providing the primary game to the player;

receiving information indicative of a player's interaction with the Web page at the Web server device;

sending a first transaction request from the Web server device to a transaction server device based at least in part on the interaction;

sending a second transaction request from the transaction server device to the respective gaming device based at least in part on the first transaction request;

receiving a second transaction reply from the respective gaming device at the transaction server device;

sending a first transaction reply from the transaction server device to the Web server device; and providing Web content from the Web server device to the Web browser based at least in part on the first transaction reply to change the at least one display based at least in part on the Web content, wherein authenticating the respective gaming device includes sending an electronic certificate from the gaming device to the Web server device, and validating the electronic certificate at the Web server device by the at least one microprocessor.

21. The method of claim 20 wherein the Web content comprises a second Web page.

22. The method of claim 20 wherein the Web page includes a Web-based application and the Web content is received by the Web-based application.

23. The method of claim 20 wherein the Web server device and the transaction server device are separate hardware devices.

24. The method of claim 20 wherein communications between the respective gaming device and the Web server device conform to HTTPS, communications between the Web server device and the transaction server device conform to S2S protocol, and communications between the transaction server device and the respective gaming device conform to G2S protocol.

25. The method of claim 20, further comprising:

sending a request for information associated with the player from the Web server device to a player tracker server device;

receiving the player information from the player tracker server device at the Web server device;

generating a second Web page at the Web server device based at least in part on the player information;

providing the second Web page from the Web server device to the respective gaming device; and causing a displaying of the second Web page to the player via the Web browser.

26. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device via at least one microprocessor;

responsive to successful authentication of the respective gaming device, generating a Web page at a Web server device;

causing the display of the Web page by initiating on the at least one display an instance of a Web browser to display data representative of the Web page while providing the primary game to the player;

receiving information indicative of a player's interaction with the Web page at the Web server device;

sending a first transaction request from the Web server device to a transaction server device based at least in part on the interaction;

sending a second transaction request from the transaction server device to the respective gaming device based at least in part on the first transaction request;

receiving a second transaction reply from the respective gaming device at the transaction server device;

sending a first transaction reply from the transaction server device to the Web server device; and providing Web content from the Web server device to the Web browser based at least in part on the first transaction reply to change the at least one display based at least in part on the Web content, wherein authenticating the respective gaming device includes:

determining information indicative of the respective gaming device at the Web server device;

sending the information indicative of the respective gaming device to the transaction server device; and verifying the information indicative of the respective gaming device at the transaction server device.

27. The method of claim 26 wherein determining the information indicative of the respective gaming device comprises determining an IP address of the respective gaming device.

28. The method of claim 26 wherein generating the Web page at the Web server device includes generating at the Web server device a Web page that includes a secondary game configured to accept a wager.

29. The method of claim 28 wherein receiving the information indicative of the player's interaction with the Web page includes receiving a wager request to make the wager on the secondary game.

30. The method of claim 29 wherein sending the second transaction request from the transaction server device to the respective gaming device includes sending a credit transaction request to subtract an amount of the wager from a credit meter of the respective gaming device.

31. The method of claim 30 wherein the second transaction reply is indicative of successful subtraction of the amount of the wager.

32. The method of claim 29, further comprising:

causing a changing of the at least one display based at least in part on the Web content by displaying the secondary game in a state that enables play.

33. A computer-implemented method of enabling interaction with Web pages in a gaming property, the method comprising:

providing a primary game to a player via a respective gaming device of a plurality of networked gaming devices, the respective gaming device including at least one display;

authenticating the respective gaming device via at least one microprocessor;

responsive to successful authentication of the respective gaming device, generating a Web page at a Web server device;

causing the display of the Web page by initiating on the at least one display an instance of a Web browser to display data representative of the Web page while providing the primary game to the player;

receiving information indicative of a player's interaction with the Web page at the Web server device;

sending a first transaction request from the Web server device to a transaction server device based at least in part on the interaction;

sending a second transaction request from the transaction server device to the respective gaming device based at least in part on the first transaction request;

receiving a second transaction reply from the respective gaming device at the transaction server device;

sending a first transaction reply from the transaction server device to the Web server device;

providing Web content from the Web server device to the Web browser based at least in part on the first transaction reply to change the at least one display based at least in part on the Web content;

providing a second Web page from the Web server device to the respective gaming device;

causing a displaying of the second Web page to the player via the Web browser;

receiving information indicative of a player's second interaction with the second Web page at the Web server device;

sending a reservation request from the Web server device to a reservations server device based at least in part on the second interaction;

sending a reservation reply from the reservations server device to the Web server device;

providing second Web content from the Web server device to the respective gaming device based at least in part on the reservation reply; and causing a changing of the at least one display based at least in part on the second Web content.

34. The method of claim 33, wherein providing the second Web page includes providing information indicative of at least one of a number of dining choices or a number of hotel choices associated with the gaming property.

35. The method of claim 34, wherein receiving the information indicative of the player's second interaction includes receiving a request to make a hotel reservation.

36. The method of claim 35, wherein the reservations server device is configured to accept hotel reservations.

* * * * *